(12) United States Patent
Wilson et al.

(10) Patent No.: US 8,664,548 B2
(45) Date of Patent: Mar. 4, 2014

(54) TOUCH CONTROLLER WITH IMPROVED DIAGNOSTICS CALIBRATION AND COMMUNICATIONS SUPPORT

(75) Inventors: Thomas James Wilson, Pleasanton, CA (US); Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1138 days.

(21) Appl. No.: 12/558,140

(22) Filed: Sep. 11, 2009

(65) Prior Publication Data
US 2011/0061948 A1  Mar. 17, 2011

(51) Int. Cl.
*G08C 21/00* (2006.01)
*G06F 3/041* (2006.01)

(52) U.S. Cl.
USPC ........................................ 178/18.01; 345/173

(58) Field of Classification Search
None
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,585,817 A | 12/1996 | Itoh et al. |
| 5,729,008 A | 3/1998 | Blalock et al. |
| 5,812,109 A | 9/1998 | Kaifu et al. |
| 5,825,352 A | 10/1998 | Bisset et al. |
| 5,835,079 A | 11/1998 | Shieh |
| 5,880,411 A | 3/1999 | Gillespie et al. |
| 6,005,681 A | 12/1999 | Pollard |
| 6,188,391 B1 | 2/2001 | Seely et al. |
| 6,310,610 B1 | 10/2001 | Beaton et al. |
| 6,323,846 B1 | 11/2001 | Westerman et al. |
| 6,502,191 B1 | 12/2002 | Smith et al. |
| 6,690,387 B2 | 2/2004 | Zimmerman et al. |
| 6,864,860 B1 | 3/2005 | Zien |
| 7,015,894 B2 | 3/2006 | Morohoshi |
| 7,184,064 B2 | 2/2007 | Zimmerman et al. |
| 7,190,336 B2 | 3/2007 | Fujisawa |
| 7,436,394 B2 | 10/2008 | Halcrow et al. |
| 7,500,615 B2 | 3/2009 | Tamayama |
| 7,663,607 B2 | 2/2010 | Hotelling et al. |
| 7,714,923 B2 | 5/2010 | Cok et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph Haley
*Assistant Examiner* — Emily Frank
(74) *Attorney, Agent, or Firm* — Morrison & Foerster LLP

(57) ABSTRACT

A touch controller with improved diagnostics calibration and communication support includes a data capture register configured to sample data from one or a plurality of touch panel sense channels at an output of an analog to digital (A/D) converter. The sampled data is bit packed, and a demodulation waveform is captured, correlated with the sampled data. The contents of the data capture register, including the sampled data and the demodulation waveform, are transferred to a memory configured to create one or more records from the transferred contents. A processor can be used to extract the one or more records captured in the memory to display to a user for diagnostics or calibration.

23 Claims, 15 Drawing Sheets

(56) References Cited

U.S. PATENT DOCUMENTS

| | | | |
|---|---|---|---|
| 8,479,122 B2 | 7/2013 | Hotelling et al. | |
| 2004/0140973 A1 | 7/2004 | Zanaty | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0259043 A1* | 10/2008 | Buil et al. | 345/173 |
| 2009/0025987 A1* | 1/2009 | Perski et al. | 178/18.03 |
| 2009/0114456 A1* | 5/2009 | Wisniewski | 178/18.03 |
| 2009/0153493 A1* | 6/2009 | Mizutani et al. | 345/173 |
| 2010/0060592 A1 | 3/2010 | Bernstein et al. | |
| 2010/0201812 A1* | 8/2010 | McGibney et al. | 348/143 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Oct. 18, 2012, for U.S. Appl. No. 12/208,332, filed Sep. 10, 2009, 12 pages.

Non-Final Office Action mailed Apr. 13, 2012, for U.S. Appl. No. 12/208,332, filed Sep. 10, 2009, 16 pages.

Non-Final Office Action mailed Oct. 9, 2013, for U.S. Appl. No. 12/208,332, filed Sep. 10, 2009, 14 pages.

* cited by examiner

TOUCH CONTROLLER WITH IMPROVED DIAGNOSTICS CALIBRATION AND COMMUNICATIONS SUPPORT

FIELD

This relates generally to touch sensor panels, and in particular, to touch controllers with improved diagnostics calibration and communications support.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO), often arranged in rows and columns in horizontal and vertical directions on a substantially transparent substrate. Drive signals can be transmitted through the drive lines, which can result in the formation of static mutual capacitance at the crossover points (sensing pixels) of the drive lines and the sense lines. The static mutual capacitance, and any changes to the static mutual capacitance due to a touch event, can be determined from sense signals that can be generated in the sense lines due to the drive signals.

SUMMARY

This relates to a touch controller with improved diagnostics calibration and communications support. According to various embodiments, a touch controller can include a capture register configured to sample data from one or a plurality of touch panel sense channels at an output of an analog to digital (A/D) converter. A direct memory access (DMA) register can be configured to bit pack the sampled data and capture a demodulation waveform correlated with the sampled data. The contents of the DMA register, including the sampled data and the demodulation waveform, can be transferred to a data tightly coupled memory (DTCM) configured to create one or more records from transferred contents. Various embodiments can further include a local and/or host processor configured to extract the one or more records captured in the DTCM or the DMA register. By capturing raw touch data prior to demodulation and making this data available, enhanced diagnostics support can be provided. With the captured data, problem areas can be identified, noise, gain and clipping measurements can be obtained, and the phase relationship between the demodulation waveform and the captured touch data can be determined. In fact, from the captured data, the demodulation result register can be re-created in its entirety.

In particular, according to various embodiments, the local processor of the touch controller can calibrate a gain of the one or a plurality of sense channels, based on at least part of the one or more records captured in the DTCM. In addition, a relative phase shift between the sampled waveform data from the sense channels and the demodulation waveform can be determined. By this determination, a phase of the one or a plurality of sense channels can be calibrated, based on at least part of the one or more records captured in the DTCM.

Furthermore, the touch controller may include advanced communications support enabling the touch controller to communicate with a plurality of touch controllers through the touch interface. The transmit section of the touch controller can be used to transmit arbitrary data modulated onto the touch stimulus signal. Similarly, the receive section of a touch controller can be used to receive modulated arbitrary data through the touch interface.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to a touch controller with improved diagnostics, calibration and commutations support. According to various embodiments, the touch controller can include a data capture register configured to sample data from one or a plurality of touch panel sense channels prior to demodulation (e.g., at an output of an analog to digital (A/D) converter). A direct memory access controller (DMAC), for example, can be configured to bit pack the sampled data and capture a demodulation waveform correlated with the sampled data. The contents of the DMA register, including the sampled data and the demodulation waveform, can be transferred to a data tightly coupled memory (DTCM), for example, using a local bus, where the DTCM can be configured to create one or more records from the transferred contents. Embodiments can include a host or local processor configured to extract the one or more records captured in the DTCM or DMA register, in order for a user to display the records, for example. Of course various forms of memory (e.g., cache) can be utilized; however a DMAC and DTCM are described herein for exemplary purposes.

By capturing raw touch data prior to demodulation and making this data available, enhanced diagnostics support can be provided. According to various embodiments, the host processor or the local processor of the touch controller can calibrate a gain of the one or a plurality of sense channels, based on at least part of the one or more records captured in the DTCM. In addition, a relative phase shift between the sampled waveform data from the sense channels and the demodulation waveform can be determined. Using this determination, the phase adjustment of the one or a plurality of sense channels can be calibrated, based on at least part of the one or more records captured in the DTCM. With the captured data, problem areas can be identified, and noise, amplitude and phase measurements can be obtained. In fact, the demodulation result can be re-created in its entirety.

It should be understood that the various embodiments are applicable to both mutual and self-capacitance sensor panels, single and multi-touch sensor panels, and other sensors in which multiple simultaneous stimulation signals are used to generate a composite sense signal. Furthermore, it should be understood that various embodiments are also applicable to various touch sensor panel configurations, such as configurations in which the drive and sense lines are formed in non-orthogonal arrangements, on the back of a cover glass, on the same side of a single substrate, or integrated with display circuitry.

Figure 1:
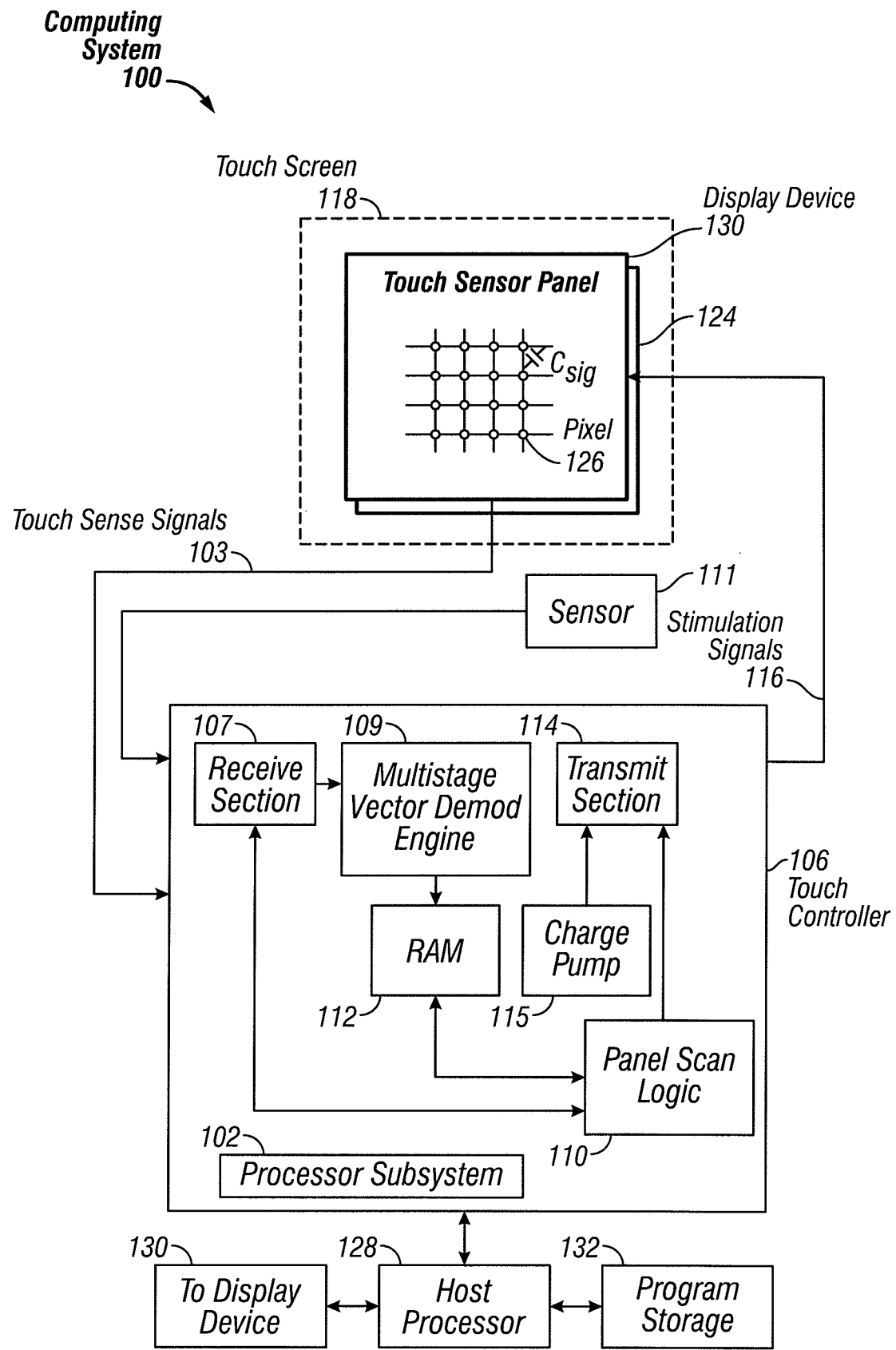
FIG. 1 illustrates an example computing system according to various embodiments.

FIG. 1 illustrates example computing system 100 that can utilize multi-touch controller 106 with integrated drive system according to various embodiments. Touch controller 106 can be a single application specific integrated circuit (ASIC) that can include one or more processor subsystems 102, which can include, for example, one or more main (local) processors, such as ARM968 processors or other processors with similar functionality and capabilities. However, in other embodiments, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from the sense lines of touch sensor panel 124, other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive lines of touch sensor panel 124.

Charge pump 115 can be used to generate the supply voltage for the transmit section. Stimulation signals 116 (Vstim) can have amplitudes higher than the maximum voltage the ASIC process can tolerate by cascoding transistors. Therefore, using charge pump 115, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some embodiments, the drive and sense lines can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces of other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to or above and below (cross) each other (but without making direct electrical contact with each other), the drive and sense lines can essentially form two electrodes (although more than two traces could intersect as well). Each intersection of drive and sense lines can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some embodiments, host processor 128 can be a separate component from touch controller 106, as shown. In other embodiments, host processor 128 can be included as part of touch controller 106. In still other embodiments, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
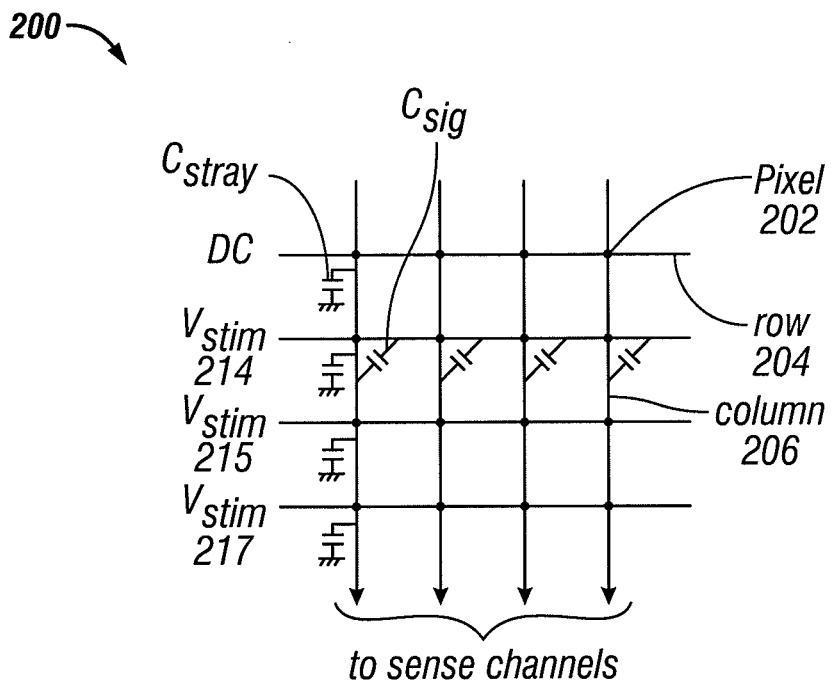
FIG. 2a illustrates an exemplary mutual capacitance touch sensor panel according to various embodiments.

FIG. 2a illustrates exemplary mutual capacitance touch sensor panel 200 according to an embodiment of the present disclosure. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, AC stimuli Vstim 214, Vstim 215 and Vstim 217 can be applied to several rows, while other rows can be connected to DC. Vstim 214, Vstim 215 and Vstim 217 can be at different frequencies and phases, as will be explained later. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 214, 215 and 217 can include one or more bursts of sine waves. Note that although FIG. 2a illustrates rows 204 and columns 206 as being substantially perpendicular, they need not be so aligned, as described above. As described above, each column 206 can be connected to a sense channel (see sense channels 108 in FIG. 1).

Figure 2B:
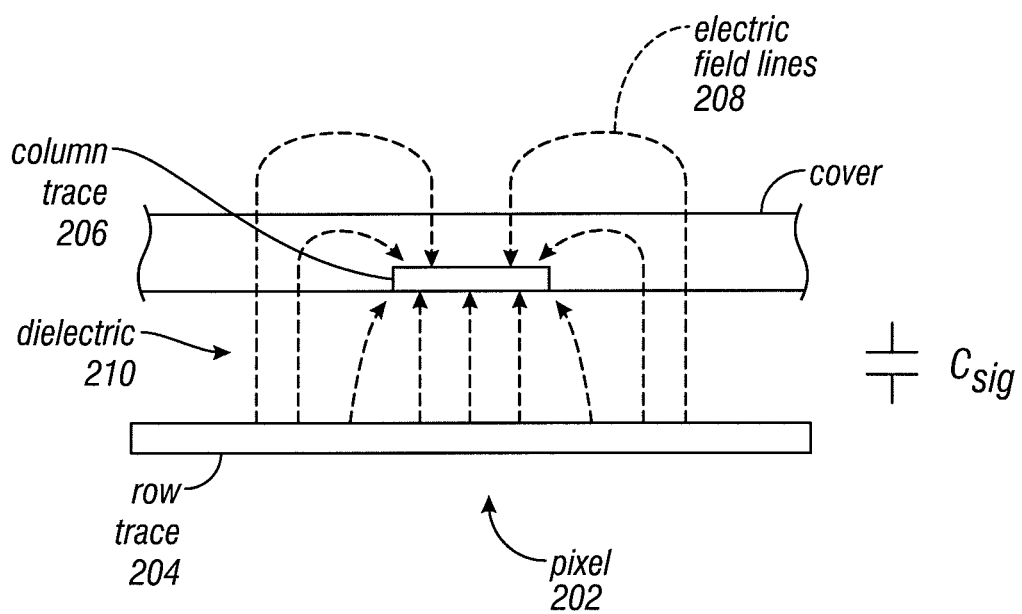
FIG. 2b is a side view of an exemplary pixel in a steady-state (no-touch) condition according to various embodiments.

FIG. 2b is a side view of exemplary pixel 202 in a steady-state (no-touch) condition according to various embodiments. In FIG. 2b, an electric field of electric field lines 208 of the mutual capacitance between column 206 and row 204 traces or electrodes separated by dielectric 210 is shown.

Figure 2C:
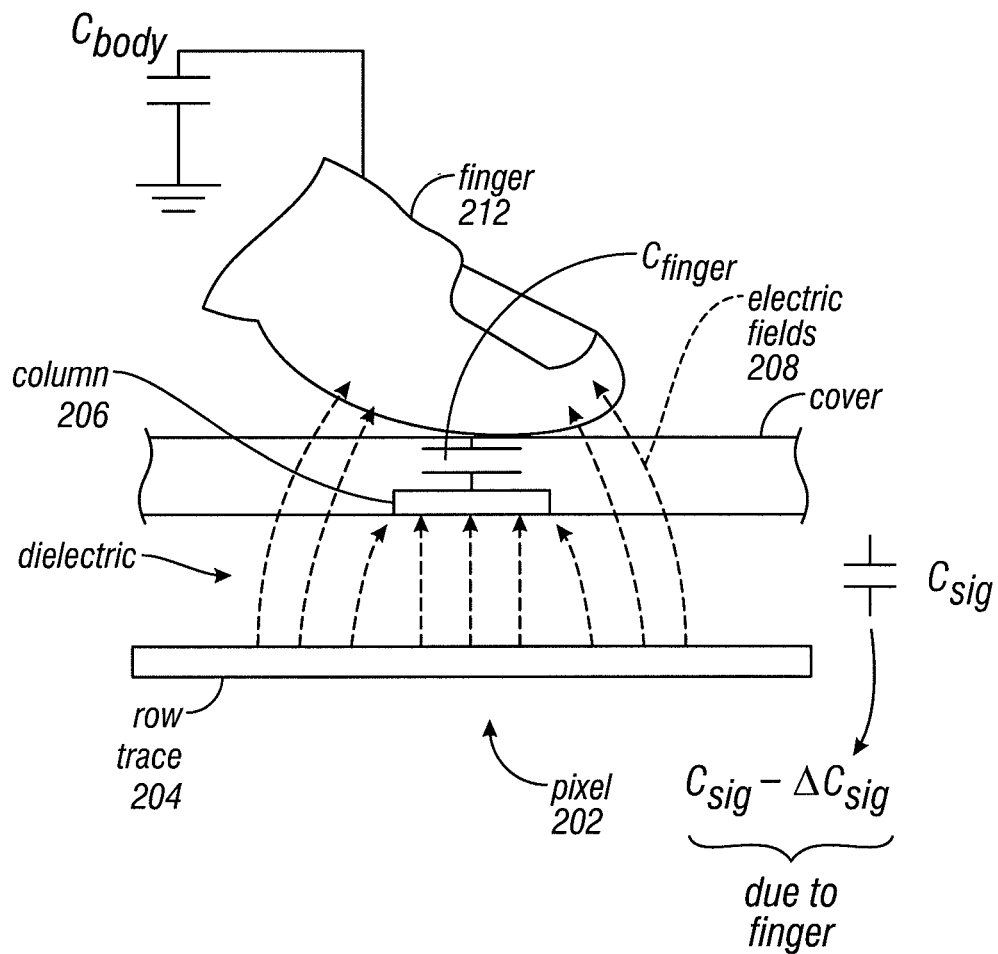
FIG. 2c is a side view of an exemplary pixel in a dynamic (touch) condition according to various embodiments.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody, where Cbody is typically much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by dΔCsig. In other words, the combined body and finger capacitance act to reduce Csig by an amount dΔCsig (which can also be referred to herein as Csig_sense), and can act as a shunt or dynamic return path to ground, blocking some of the electric fields as resulting in a reduced net signal capacitance. The signal capacitance at the pixel becomes Csig-dΔCsig, where Csig represents the static (no touch) component and dΔCsig represents the dynamic (touch) component. Note that Csig-dΔCsig can always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus dΔCsig can be variable and representative of how completely the finger is pushing down on the panel (i.e. a range from "no-touch" to "full-touch").

Figure 3:
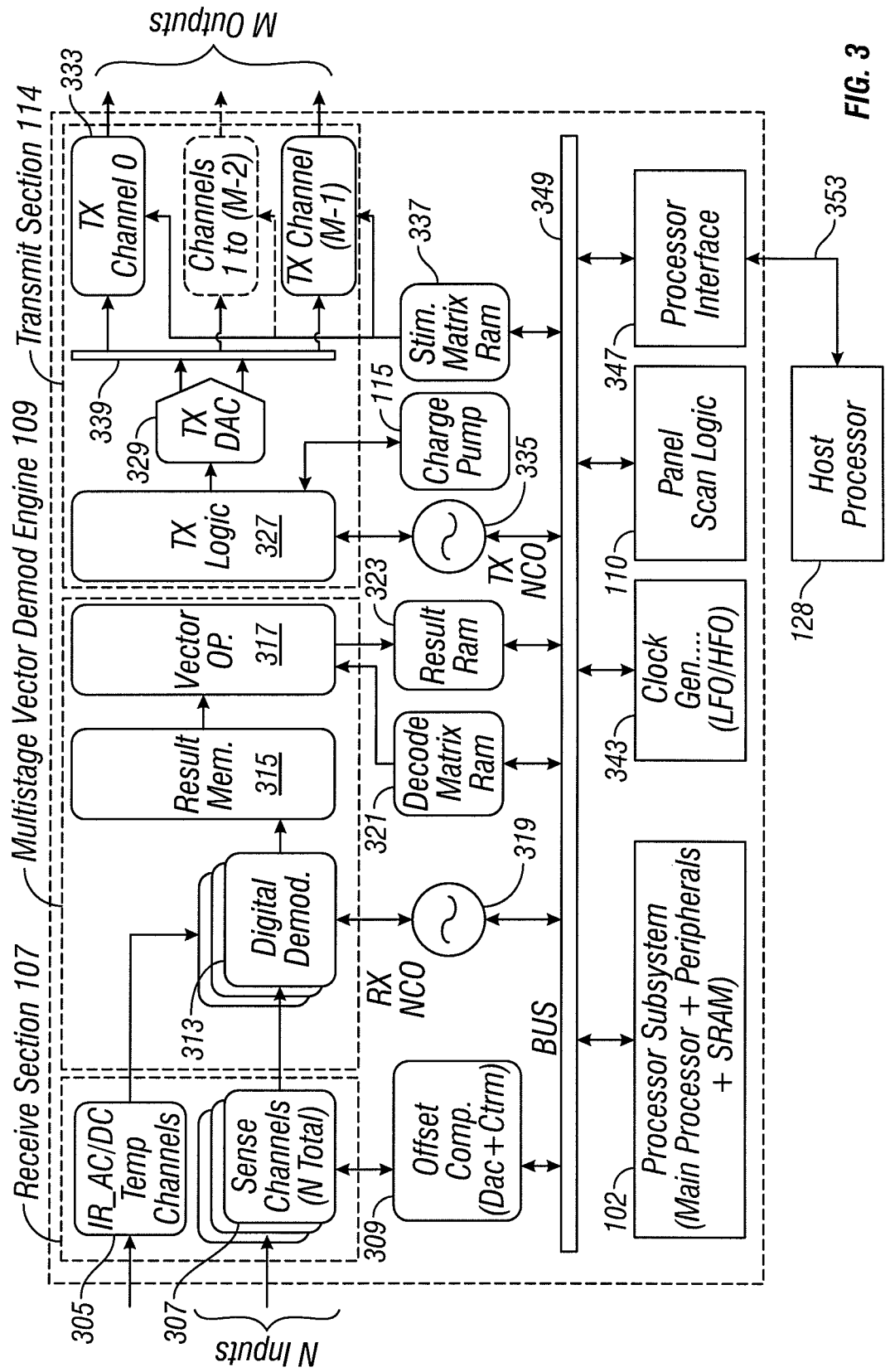
FIG. 3 illustrates an example application-specific integrated circuit (ASIC) single chip multi-touch controller according to various embodiments.

FIG. 3 is a more detailed block diagram of an example touch controller 106 (e.g., a multi-touch controller) according to an embodiment of the present disclosure. Receive (RX) section 107 of touch controller 106 can include miscellaneous channels 305 (e.g., channels for infrared sensors, temperature sensors, etc.) and a total of N receive channels, such as sense channels 307. Sense channels 307 can be connected to an offset compensator 309. Multistage vector demodulation engine 109 can include a digital demodulation section 313, a result memory 315, and a vector operator 317. Digital demodulation section 313 can be connected to a receive NCO 319, and vector operator 317 can be connected to a decode matrix RAM 321 and connected to a result RAM 323. Transmit (TX) section 114 includes a transmit logic 327, a transmit DAC 329, and a total of M transmit channels 333. Transmit NCO 335 can provide a clock to transmit logic and TX DAC, and charge pump 115 can provide power to the transmit channels. Transmit channels 333 can be connected to a stimulation matrix RAM 337 via an analog bus 339. Decode matrix RAM 321, result RAM 323, and stimulation matrix RAM 337 could be, for example, part of RAM 112. Processor subsystem 102 can store and update, for example, a decode matrix in decode matrix RAM 321 and a stimulation matrix in stimulation matrix RAM 337, initialize the multi-touch subsystem, for example, process data from the receive channels and facilitate communications with the host processor.

FIG. 3 shows processor subsystem 102, panel scan logic 110, and host processor 128. FIG. 3 also shows a clock generator 343 and a processor interface 347. Various components of touch controller 106 can be connected together via a peripheral bus 349. Processor interface 347 can be connected to host processor 128 via a processor interface (PI) connection 353.

Figure 4:
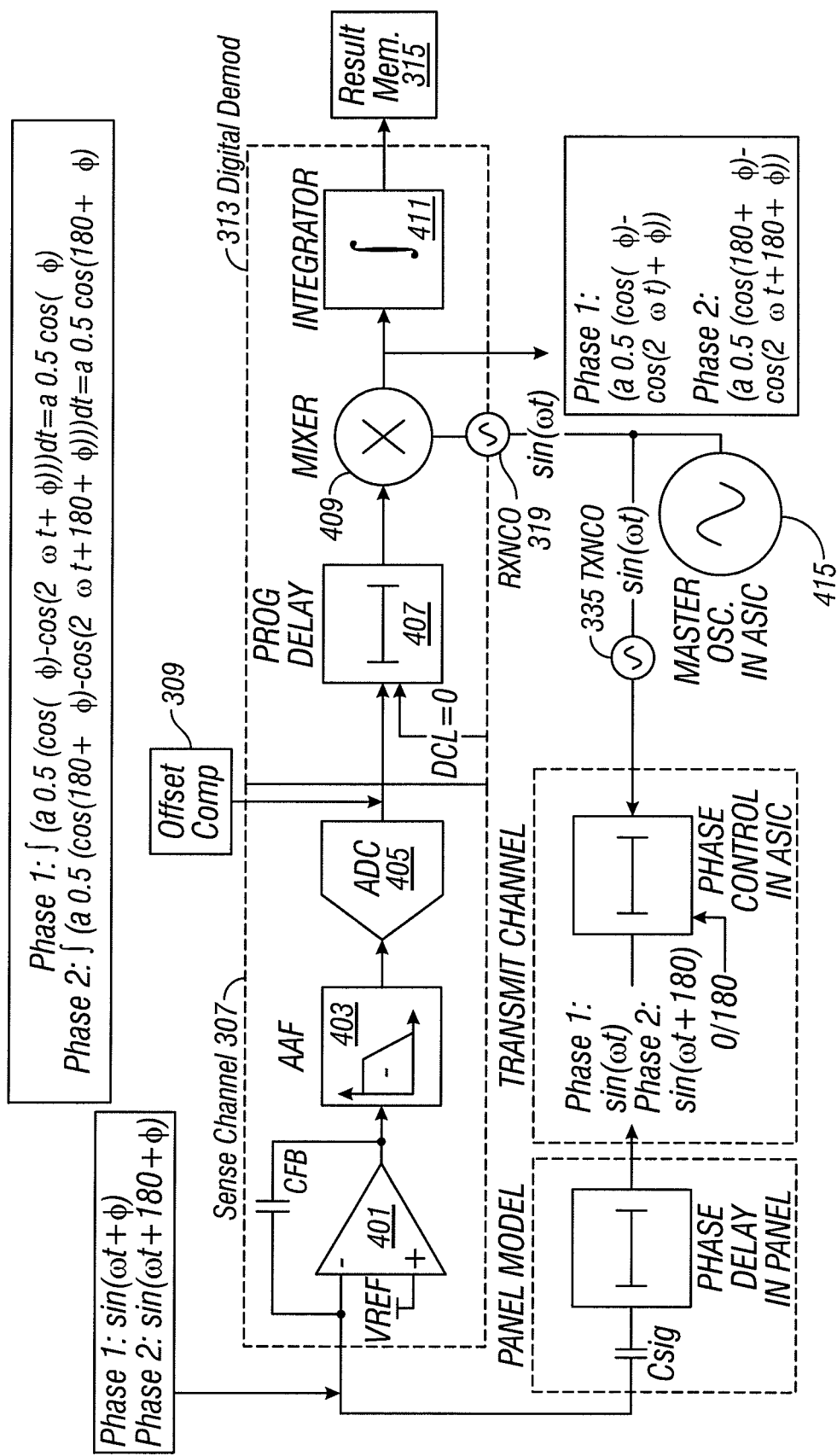
FIG. 4 illustrates details of one of the sense channels and digital demodulation section according to various embodiments.

FIG. 4 illustrates details of one of the sense channels 307 and digital demodulation section 313 according to an embodiment of the present disclosure. As shown in FIG. 4, sense channel 307 can include a transimpedance amplifier (pre-amplifier) 401, an anti-alias filter (AAF) 403, and an analog-to-digital converter (ADC) 405. Digital demod section 313 can include a programmable delay 407, a mixer (signal multiplier) 409, and an integrator 411. In each step of the scan, pre-amplifier 401 of sense channel 307 can receive a composite signal representative of charge coupling between one or more drive lines and a sense line along with a programmable offset.

In some cases, the sense signal can be adjusted by offset compensator 309 prior to being input to pre-amplifier 401. Adjusting the offset of the digital signal can reduce the dynamic range of some stimulation signals generated from highly variable stimulation matrices. In particular, some highly variable stimulation matrices can result in sense signals having a dynamic range greater than the dynamic input range of pre-amplifier 401, that is, the maximum signal magnitude that the amplifier can accept before the charge amplifier saturates. For example, in the case that the stimulation matrix is a Hadamard matrix, in one of the steps in the scan all of the channels are driven with stimulation signals having the same phase, and it is possible that all of the resulting component sense signals would add up to generate a composite sense signal with an amplitude that saturates pre-amplifier 401. In this case, offset compensation would be used to subtract sufficient charge from the input charge as to prevent the charge amplifier from saturating. Offset compensation during a scan can be performed on-the-fly, that is, different offset compensation can be applied during different steps of the scan.

In another example embodiment, saturation of pre-amplifier 401 can be mitigated by adjusting, for example, the capacitive or resistive feedback of the amplifier. In this case, individual sense channels could be adjusted, but the adjustment would remain the same for each step in a scan. This approach can be acceptable in the case that the stimulation matrix being used causes the same or similar imbalances of signals in the channels throughout the scan, and the amount of adjustment is not too great, e.g., up to a factor of 2. For example, using a circulant matrix as the stimulation matrix causes a fixed imbalance across all steps.

The processing of a sense signal to obtain a value for Qsig_total is described below in reference to processing a single component of the sense signal of one sense channel (resulting from the stimulation of one of the channel's pixels) to obtain a single Qsig component of Qsig_total for that sense channel. However, it is understood that the analysis applies to all component signals, and that an actual Qsig_total result can be understood as simply a superposition of the individual Qsig results of the other component signals.

When a stimulation signal, Vstim, is applied to the drive line of a pixel, the AC portion of the stimulation signal, Vstim_AC(t), can be coupled through to the sense line, generating a signal charge Qsig(t) that tracks Vstim_AC(t) with an amplitude proportional to the signal capacitance Csig of the pixel. Qsig(t) can be expressed as:

$$Q\text{sig}(t) = C\text{sig} \times V\text{stim\_AC}(t) \tag{1}$$

A feedback capacitance, for example, in the feedback path of pre-amplifier 401 can convert the injected signal charge into an output voltage relative to the reference voltage of VREF of the charge amplifier $$V_{amp\_out}(t) = \frac{Q\text{sig}(t)}{C_f} \tag{2}$$

Substituting for Qsig(t) using equation (1) yields:

$$V_{amp\_out}(t) = \frac{C\text{sig}}{C_f} \times V\text{stim\_AC}(t) \tag{3}$$

Thus, pre-amplifier 401 outputs a signal whose amplitude is the stimulus amplitude Vamp_out(t) scaled by the gain (Csig/Cf) of the charge amplifier. In more general terms, sensor panel 124 adds an amplitude modulation to the drive signal, the amplitude modulation carrying information about something to be sensed, e.g. a finger, etc.

The output of pre-amplifier 401 can be fed into AAF 403. AAF 403 can attenuate noise components above the nyquist sampling limit of the ADC sufficiently to prevent those components from aliasing back into the operating frequency range of touch controller 106. Furthermore, AAF 403 can attenuate any noise outside the frequency operating range of touch controller 106 and therefore can help to improve the Signal-to-Noise ratio. It also can be important to properly select the sampling clock FCLK_DAC of the TX DAC. Generating a signal of frequency FSTM at the TX DAC clock rate will can introduce images in the spectrum of the TX DAC output signal at n*FCLK_DAC+/−FSTM whereas N=1, 2 . . . , to infinity. The images can appear in the composite signal entering the receive channel. Upon sampling the composite signal with the ADC in the receive channel, those images can be folded around the sampling frequency FCLK_ADC at which the ADC samples the composite touch signal. The output of the ADC therefore can have the following frequency components: N*(FCLK_DAC+/−FCLK_ADC)+/−FSTM. If the DAC and ADC clock rate FCLK_DAC and FCLK_ADC, respectively, are the same frequency, these images appear in the pass-band. In the above example, one possible frequency component would be (FCLK_DAC−FCLK_ADC)+FSTM=FSTM and therefore would appear as an undesirable in band component which would lead to reduced SNR and therefore reduced touch performance. Therefore, it can be beneficial to select a TX DAC sampling frequency FCLK_DAC that is different from the ADC sampling rate. This can prevent the images from folding back into the pass-band. In one embodiment, FCLK_DAC can be twice of the ADC clock rate FCLK_ADC. The two clock sources can be correlated, i.e. based on the same master clock. It can be beneficial to make the DAC sampling clock higher in frequency than the ADC sampling clock as DACs can consume less power than the power consumed by all ADCs combined for the same increase in sampling clock frequency.

The output of AAF 403 can be converted by ADC 405 into a digital signal, which can be sent from sense channel 307 to digital demodulation section 313. Digital demodulation section 313 can demodulate the digital signal received from sense channel 307 using a homodyne mixing process in which the signal is multiplied with a demodulation signal of the same frequency. In order to increase the efficiency of the mixing process, it can be desirable to adjust the phase of the sense channel output signal to match the phase of the demodulation signal. Stimulating a pixel of sensor panel 124 with Vstim+ and processing the resulting sense signal as described above would result in the following output from sense channel 307:

$$V_{sense\_ch\_outV+}(t) = \frac{Csig}{C_f} \times V_0 \sin(\omega t + \theta) \quad (4)$$

where: $V_0$=the amplitude of the AC portion of Vstim=2.25V
$\theta$=the relative phase delay between the signal output of ADC 405 and the demodulation signal for a given sense channel For stimulation with Vstim−, the resulting output from ADC 405 would be:

$$V_{sense\_ch\_outV-}(t) = \frac{Csig}{C_f} \times V_0 \sin(\omega t + 180° + \theta) \quad (5)$$

The relative phase delay $\theta$ can be an aggregate of delays caused by various elements of the system, such as the geometry of the signal paths, the operation of the output buffers, etc. In general, the various delays in the system can be separated into two categories, delays that apply equally to all drive lines of a sense channel, referred to as global delays herein, and delays that vary among the drive lines of the sense channel, referred to as individual line delays herein. In other words, global delays can affect all component signals of the composite sense signal equally, while individual line delays can result in different amounts of delay for different component signals. The relative phase delay can be represented in terms of $\phi_{DCL}$:

$$\phi = \phi_{DCL} + \phi(R) \quad (6)$$

where: $\phi_{DCL}$=the sum of all global phase delays (referred to herein as the composite global phase delay) affecting a sense channel
$\phi(R)$=the individual line delay associated with drive line R of a sense channel Substituting equation (6) into equations (4) and (5) yields:

$$V_{sense\_ch\_outV+}(t) = \frac{Csig}{C_f} \times V_0 \sin(\omega t + \varphi_{DCL} + \phi(R)) \quad (7)$$

$$V_{sense\_ch\_outV-}(t) = \frac{Csig}{C_f} \times V'_0 \sin(\omega t + 180° + \varphi_{DCL} + \phi(R)) \quad (8)$$

Since the global phase delays affect all of the component signals of the sense signal equally, once the composite global phase delay $\phi_{DCL}$ has been determined for a channel, the global portion of the phase delay of sense channel output signal can be removed by programmable delay 407, yielding:

$$V_{mixer\_inV+}(t) = \frac{Csig}{C_f} \times V_0 \sin(\omega t + \phi(R)) \quad (9)$$

$$V_{mixer\_inV-}(t) = \frac{Csig}{C_f} \times V_0 \sin(\omega t + 180° + \phi(R)) \quad (10)$$

as the signals corresponding to Vstim+ and Vstim−, respectively, that are input into mixer 409.

Since the individual line delays are different for different signal components of the sense signal, the individual line delays cannot be removed from the sense signal simply by using a single phase adjustment to the composite sense signal, such as the phase adjustment made by programmable delay 407. However, the individual line delays can be accounted for by the compensated phase matrix $\tilde{M}_{comp}^{-1}$, which is described in more detail below.

The phase-adjusted signal can be sent from programmable delay 407 to mixer 409. Mixer 409 can multiply the phase-adjusted signal with a demodulation signal, $$V_{demod} = \sin(\omega t), \quad (11)$$

which can be generated by RX NCO 319 based on a master oscillator 415. It is noted that the mixing can be performed using digital signals. This can provide higher resolution than in some previous designs, which can result in improved suppression of noise.

The resulting demodulated signal output from mixer 409 can be represented as:

$$V_{mixer\_outV+}(t) = \frac{1}{2} \times \frac{Csig}{C_f} \times V_0 \times \begin{pmatrix} \cos(\phi(R)) - \\ \cos(2\omega t + \phi(R)) \end{pmatrix} \quad (12)$$

$$V_{mixer\_outV-}(t) = \frac{1}{2} \times \frac{Csig}{C_f} \times V_0 \times \begin{pmatrix} \cos(180° + \phi(R)) - \\ \cos(2\omega t + 180° + \phi(R)) \end{pmatrix} \quad (13)$$

The mixer output can be integrated by integrator 411, yielding:

$$V_{int\_outV+} = \frac{1}{2} \times \frac{Csig}{C_f} \times V_0 \times \cos(\phi(R)) \quad (14)$$

$$V_{int\_outV-} = \frac{1}{2} \times \frac{Csig}{C_f} \times V_0 \times \cos(180° + \phi(R)) \quad (15)$$

Since the integrator has essentially a low pass response, the high frequency component $\cos(2\omega t+180°+\phi(R))$ can be eliminated leaving only the DC component.

Scaling of the results in integrator 411 by a factor of $2C_f$ results in output signals:

$$V_{int\_scaledV+} = V_0 \times \cos(\phi(R)) \times Csig, \text{ if } V\text{stim}(R) = V\text{stim}+ \quad (16)$$

$$V_{int\_scaledV-} = V_0 \times \cos(180° + \phi(R)) \times Csig, \text{ if } V\text{stim}(R) = V\text{stim}- \quad (17)$$

from integrator 411. In each step S in a scan of sensor panel 124, drive lines 204 can be driven with either Vstim+ or Vstim− drive signals based on the MUX_SEL values in stim matrix 407 for that step, each stimulation signal generating a component output (16) or (17) of integrator 411 for each sense channel. Thus, for a channel C, the output of integrator 411 can be a linear combination of corresponding components (16) and (17):

$$V_{int\_scaled\_tot\_C}(S) = V_0 \times W_C(0, S) \times Csig(0) + \quad (18)$$
$$V_0 \times W_C(1, S) \times Csig(1) + V_0 \times W_C(M-1, S) \times Csig(M-1)$$

where: $W_C(R, S) = \begin{cases} \cos(\phi_C(R)) \xrightarrow{if} V\text{stim}(R, S) = V\text{stim}+ \\ \cos(180° + \phi_C(R)) \xrightarrow{if} V\text{stim}(R, S) = V\text{stim}- \end{cases}$ The right hand side of equation (18) includes $V_0$ equal to the amplitude, Vstim, of the stimulation signals and $W_C(R,S)$ equal to the components of the compensated phase matrix $\tilde{M}_{C\_comp}$. Therefore, the output voltage of integrator 411, $V_{int\_scaled\_tot\_C}(S)$, at each step is simply the composite signal charge Qsig_tot$_C$(S).

The Qsig_tot$_C$ values output by a channel's integrator 411 can be posted to result memory 315, forming a Qsig_tot$_C$ vector:

$$\text{Qsig\_tot}_C(S) = \begin{bmatrix} \text{Qsig\_tot}_C(0) \\ \text{Qsig\_tot}_C(1) \\ \text{Qsig\_tot}_C(2) \\ \vdots \\ \text{Qsig\_tot}_C(P-1) \end{bmatrix} \quad (19)$$

that is used in a decoding operation to determine the Csig values for that channel. An example vector decode operation according to various embodiments will now be described.

Referring to FIG. 3, vector operator 317 reads the Qsig_tot$_C$ vector from memory 315 and reads the decode matrix $$\frac{\tilde{M}_{C\_comp}^{-1}}{V\text{stim}}$$

from decode matrix RAM 321. Vector operator 317 then performs vector multiplication of the Qsig_tot$_C$ vector and the decode matrix $$\frac{\tilde{M}_{C\_comp}^{-1}}{V\text{stim}}$$

according to equation (9) to obtain the Csig$_C$ vector for channel C:

$$\tilde{C}sig_C = \begin{bmatrix} Csig_C(0) \\ Csig_C(1) \\ Csig_C(2) \\ \vdots \\ Csig_C(M-1) \end{bmatrix} \quad (20)$$

The Csig$_C$ vector can be posted to result RAM 323, where it can be read by other systems, such as processor subsystem 102, host processor 128, etc., for sensing touch by comparing the Csig$_C$ vector components with known, static (no touch) values for Csig, for example.

Figure 5:
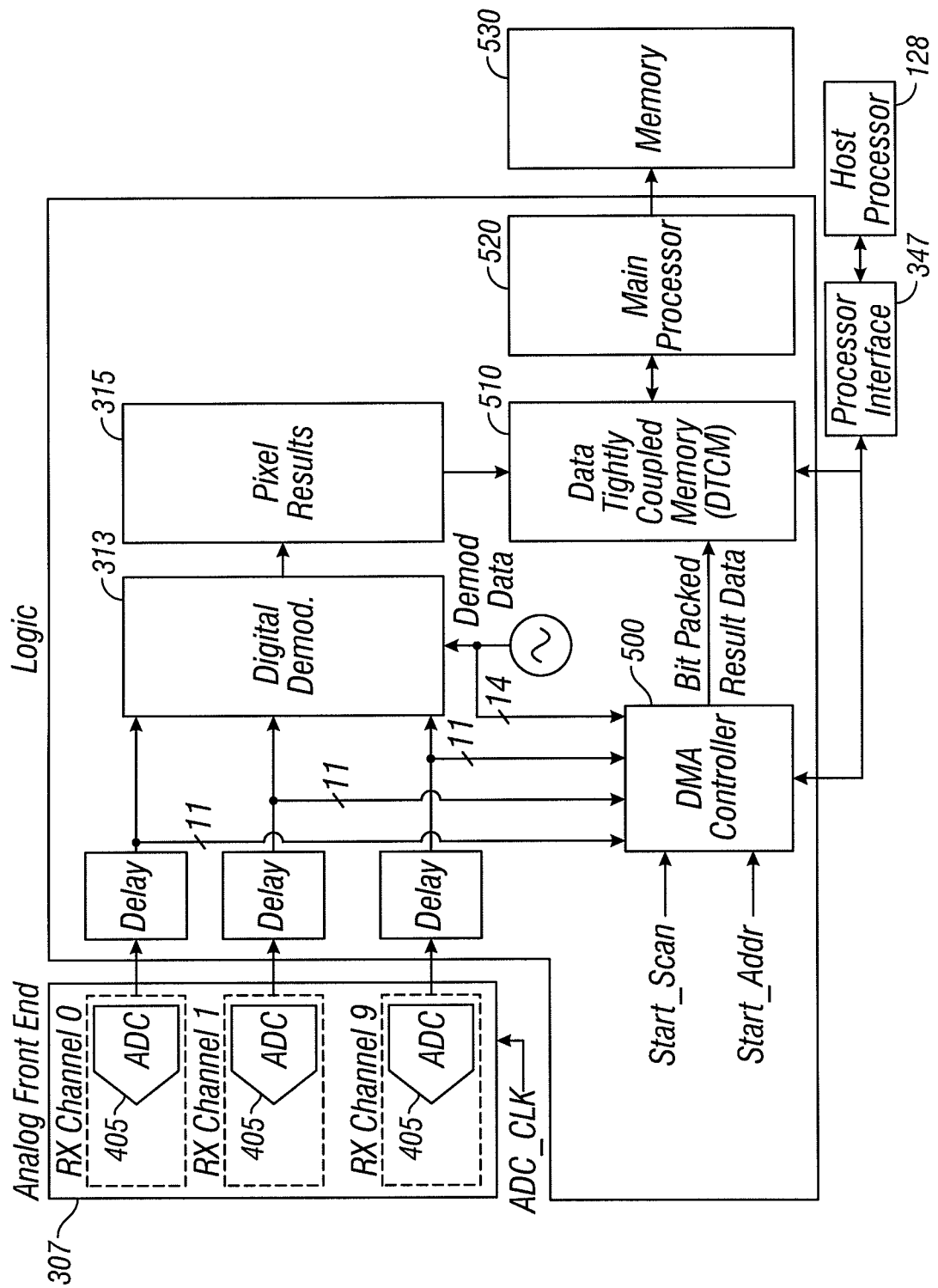
FIG. 5 illustrates details of one of the sense channels and demodulation section, with a direct memory access controller (DMAC) and a data tightly coupled memory (DTCM) for collecting sampled data, according to various embodiments.

FIG. 5 illustrates details of one of the sense channels 307 and demodulation section 313, with a direct memory access controller (DMAC) and a data tightly coupled memory (DTCM) for collecting sampled data, according to various embodiments. As shown in FIG. 5, a direct memory access controller (e.g., DMAC 500) captures raw output waveform data from A/D converter 405 at the output of sense channel 307. Data can be captured at clock rate ADC_CLK at which ADC 405 is clocked, for example. The length of the capture can be dependent on the duration of a scan (e.g., 800 samples). Any number of sense channel outputs can be captured by DMAC 500, or a separate capture register. DMAC 500 stores the captured sense channel output(s) in bit-packed format, for example, such that each bit of data of the sense channel output(s) (e.g., 10 bits per output), may be packed consecutively in communicatively-coupled 32 bit registers in DMAC 500. According to one example, four 32 bit registers can be required in DMAC 500, for 10 sense channel outputs of 10 bits each. One register bit in DMAC 500 can include a start bit, indicating the beginning of a scan sequence. Of course, one of ordinary skill in the art would understand that various sizes of registers and sense channel outputs can be substituted without departing from the scope of the present disclosure.

In addition to the sampled sense channel outputs, a demodulation waveform from mixer 409, corresponding to the sample sense channel outputs, can sent to DMAC 500, over local bus 349, for example. As described herein, the phase-adjusted signal sent from programmable delay 407 can be sent to mixer 409. Mixer 409 can multiply the phase-adjusted signal with a demodulation signal (see Equation (11)), which can be generated by RX NCO 319 based on a master oscillator, for example (not shown in FIG. 5). The resulting demodulated signal output from mixer 409 can be expressed by Equations (12) and (13) above.

The packed bits in DMAC 500 can be sent to DTCM 510, which can create records, where each record can include a sample of a predetermined number of sense channel outputs (e.g., 10 outputs) and a correlating demodulation waveform from mixer 409. DTCM 510 can include a start register (not shown) such that when the start bit stored in DMAC 500 appears in the start register, DTCM 510 begins creating the records. A user can input the start bit in order to obtain records for diagnostic purposes, for example. Alternatively, a start bit can be preprogrammed to be input to the start register at predetermined times (e.g., when a new stimulation frequency is employed or after a preset time period). According to an embodiment, every time A/D converter 405 produces a new value, for example, a record can be produced. $N_{int}$ records can be collected, where $N_{int}$ can be a programmable number (e.g., any integer from 0 to 2047) of records captured during one integration period. For example, if there are 800 A/D converter 405 clock cycles in one integration period, 800 records can be captured (i.e., $N_{int}$=800) in DTCM 510.

A processor interface from the DMAC 500 and/or DTCM 510 can be included to a separate host computer 128 via processor interface 347, for example (see FIG. 3). According to various embodiments, the raw ADC data can be transferred to a host computer 128 via processor interface 347. The host computer can extract the ADC and demodulation records for further analysis in a spreadsheet or by other means such as Matlab. Analyses can include FFTs to determine Signal-to-Noise ratio, capturing relative phases between ADC data and the demodulation waveform, determining signal amplitudes, dynamic range, settling times and to identify any anomalous effects (such as waveform clipping, etc.) Processor 520 can be the so-called "main" or local processor 102 (see FIG. 3). According to various embodiments, processor 520 can obtain the relevant phases of each sense channel output, using the records, based on the waveform data of the sense channel outputs. When the phases are compared to the correlating demodulation waveform, a phase shift can be determined. Using this phase shift information, processor 520 can, for example, dynamically adjust the phases using a delay adjustment (e.g., DCL a programmable delay 407 at FIG. 4).

In addition, using the waveform data of the sense channel outputs, local processor 520 can determine an amplitude thereof, thereby determining the gain at sense channel 307. For example processor 520 can be communicatively coupled to a min/max register (not shown), which can automatically calculate an amplitude of the waveform data. A user can use the gain data to adjust the gain of sense channel 307 (at pre-amplifier 401), or processor 520 can dynamically calibrate the gain, based on preprogrammed parameters.

Moreover, the waveform data of the sense channel outputs can be used to determined noise levels at sense channel 307. Appropriate filtering (e.g., bandpass filtering) can be manually or automatically initiated to dynamically attenuate noise in sense channel 307, if the determined noise at sense channel 307 is greater than a predetermined threshold, for instance.

According to various embodiments, records can be saved in memory 510 for future diagnostics purposes, for example. Processor 520 and memory 510 can be physically connected to sense channel 307 and/or digital demodulation section 313, or can be remote. Of course, the presently disclosed embodiments are not limited to any particular type of memory, and DMAC 500 and DTCM 510 are described herein for exemplary purposes. One of ordinary skill in the art would realize that various types of memory can be employed without departing from the scope of the present disclosure.

Figure 6A:
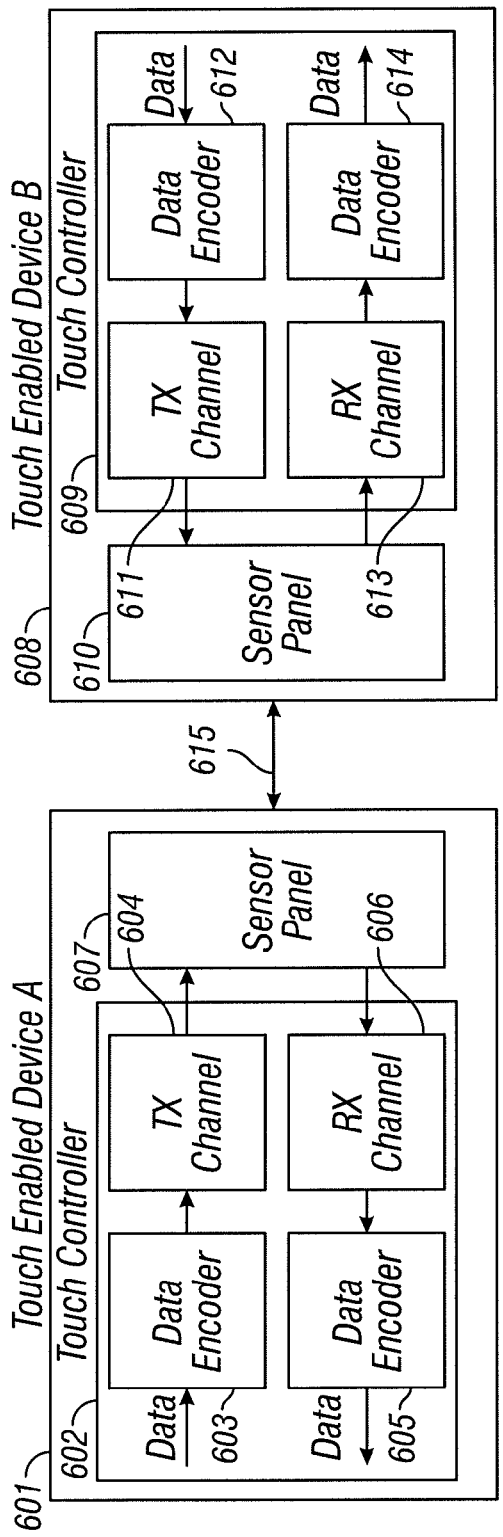
FIGS. 6a-6b show two configurations of touch enabled devices that feature touch communications, according to various embodiments.
Figure 6B:
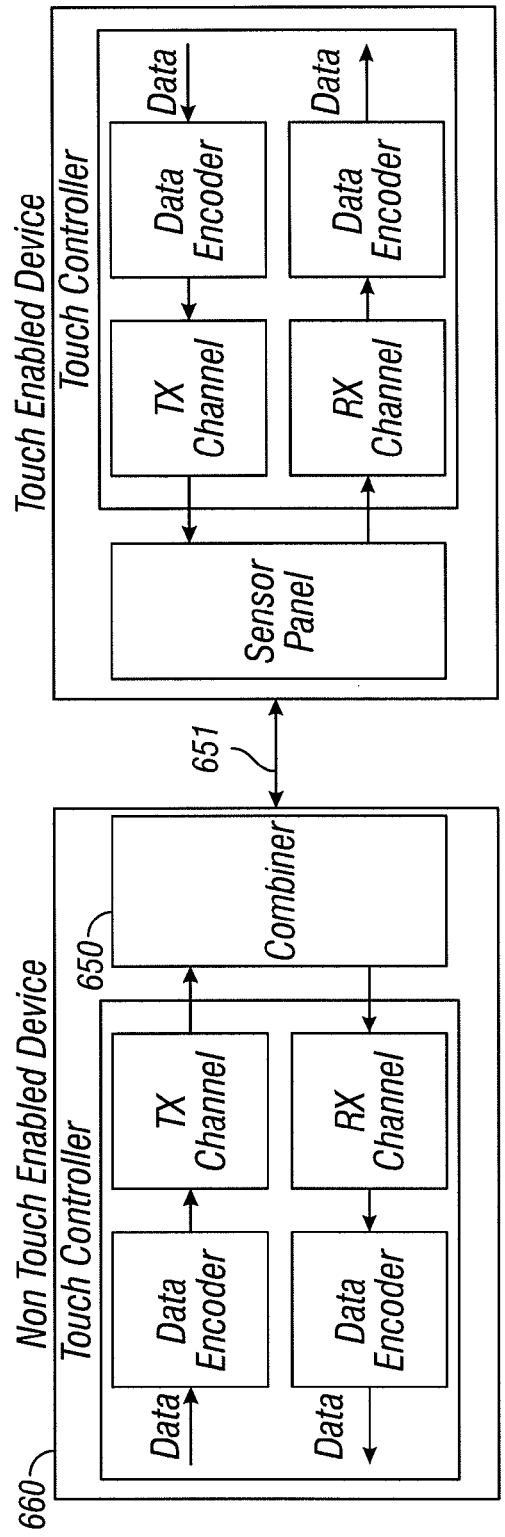

Furthermore, advanced communications for the touch controller 106 can be realized. FIGS. 6A-6B shows two configurations of touch enabled devices that feature touch communications. FIG. 6A shows a one possible configuration where two touch enabled devices 601 and 608 communicate with each other. Touch enabled device 601 transmits data by first encoding data in data encoder 603 and then transmitting data via transmit channel 604 to sensor panel. Data transfer can be facilitated through connection 615 which can be capacitively coupled to sensor panels 607 and 610. Connection 615 can merely be an air gap when the touch panels 607 and 610 can be brought in contact or close proximity. Alternatively, connection between the two panels can be facilitated by the user touching sensor panel 607 with the left hand and sensor panel 610 with the right hand, for example. The signal picked up by sensor panel 610 is then captured by receive channel 613 and then decoded by data encoder 614. In a similar fashion, data can be transferred from touch enabled device B (608) back to touch enabled device A (601). Note that TX channels 604 and 610 can have a plurality of outputs. Similarly, RX channels 606 and 613 can have a plurality of inputs.

FIG. 6B shows a different implementation where one of the devices 660 is not touch enabled. Device 660 can, for example, be a stylus. Combiner 650 AC couples TX channel output and RX channel input to common connection 651 which can be a metal tip of a stylus, for example.

Figure 7A:
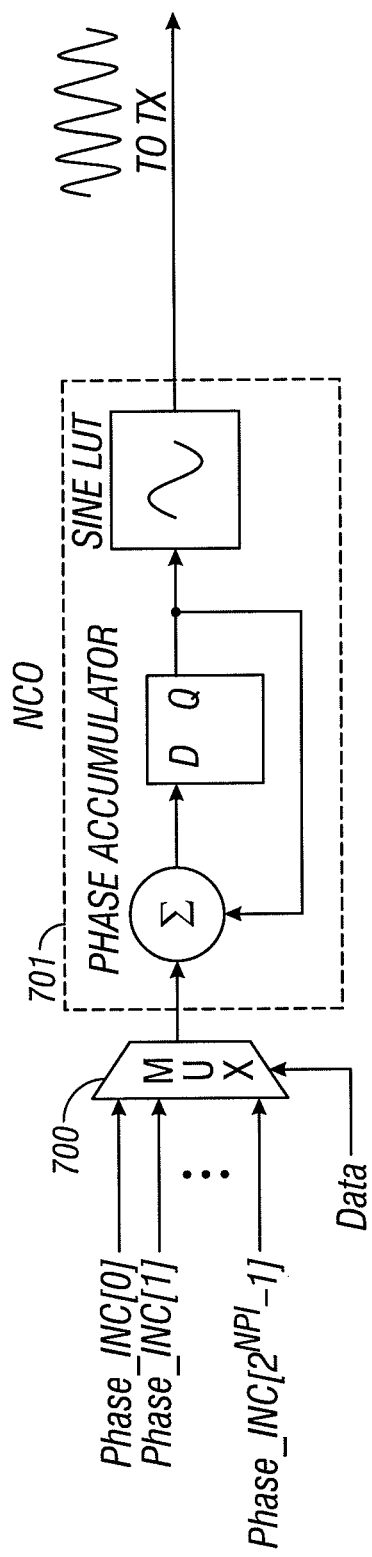
FIGS. 7a-7b show exemplary implementations of data decoders suitable for touch communications, according to various embodiments.
Figure 7B:
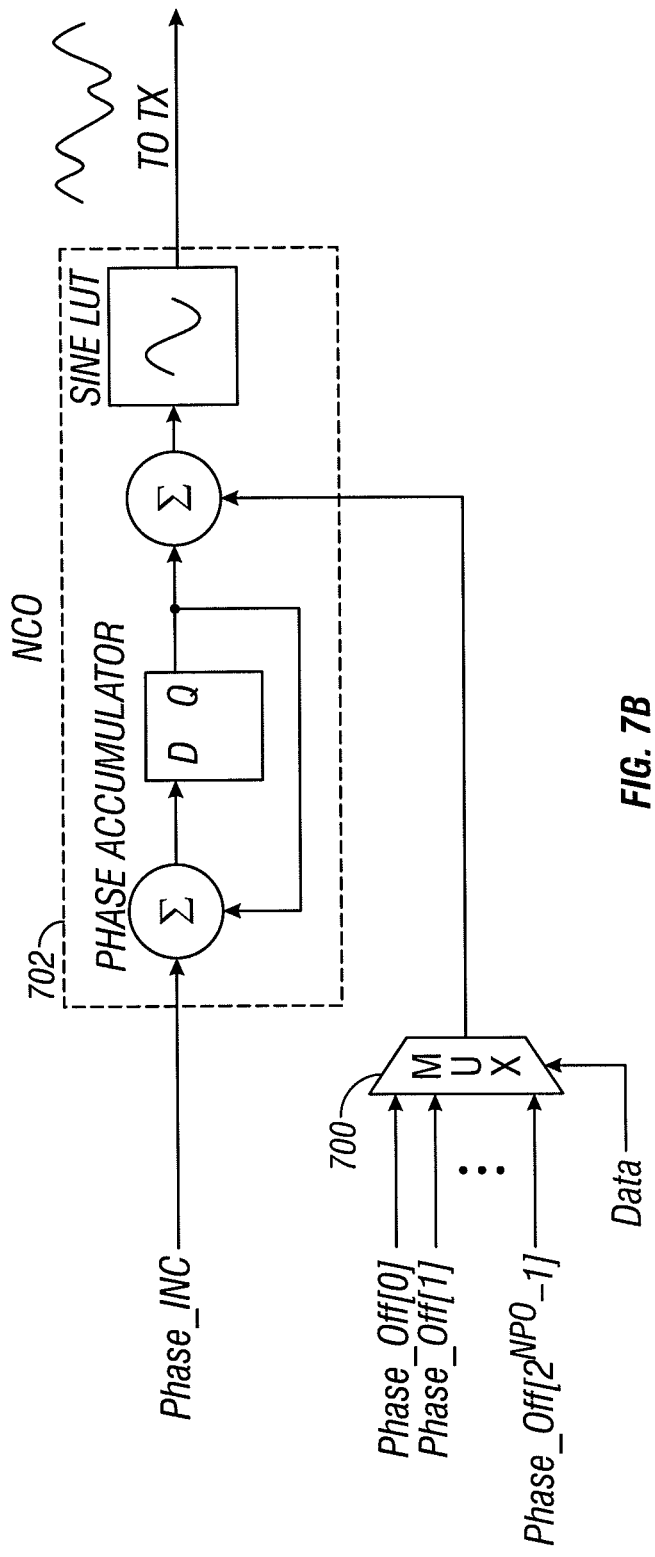

FIGS. 7A-7B show exemplary implementations of data decoders suitable for touch communications. FIG. 7A shows an FSK/FM data encoder. Each phase increment value represents a frequency as follows:

$$\varphi_{INC}(x) = 2^N \cdot \frac{f_{STM}(x)}{f_{DAC\_CLK}} \rightarrow f_{STM}(x) = \frac{\varphi_{INC}(x)}{2^N} \cdot f_{DAC\_CLK} \quad (21)$$

Here, $f_{STM}(x)$ can be the stimulus frequency for data value x; $f_{DAC\_CLK}$ can be the rate at which the phase accumulator is clocked; and N can be the resolution of the phase accumulator.

Therefore each data value can have its own stimulus frequency. The synthesized waveform can be passed on from phase accumulator 701 to the TX DAC, which converts it into a analog waveform of the form:

$$V_{STM}(x) = V_{STM0} \cdot \sin\left(\frac{2 \cdot \pi \cdot \varphi_{INC}(x) \cdot f_{DAC\_CLK}}{2^N}\right) \quad (22)$$

FIG. 7B shows an exemplary implementation of a PSK/PM encoder. Here a single phase increment is applied to the phase accumulator 702 associated with a stimulus frequency according to Equation (22). A static phase offset is added to the output of the phase comparator. The phase offset can be selected from 2^N possible phase-offsets based on a data value via the MUX 700.

$$\varphi_{OFF}(x) = 2^N \cdot \frac{\varphi(x)}{2 \cdot \pi} \rightarrow \varphi(x) = \frac{2 \cdot \pi \cdot \varphi_{OFF}(x)}{2^N} \quad (23)$$

Here $\phi_{OFF}(x)$ can be the phase offset; $\phi(x)$ can be the desired phase and N can be the data resolution, equivalent with the total number of phase-offsets.

The stimulus waveform for a PSK modulated signal therefore can have the form:

$$V_{STM}(x) = V_{STM0} \cdot \sin\left(\frac{2 \cdot \pi}{2^N} \cdot (\varphi_{INC} \cdot f_{DAC\_CLK} + \varphi_{OFF}(x))\right) \quad (24)$$

Figure 8A:
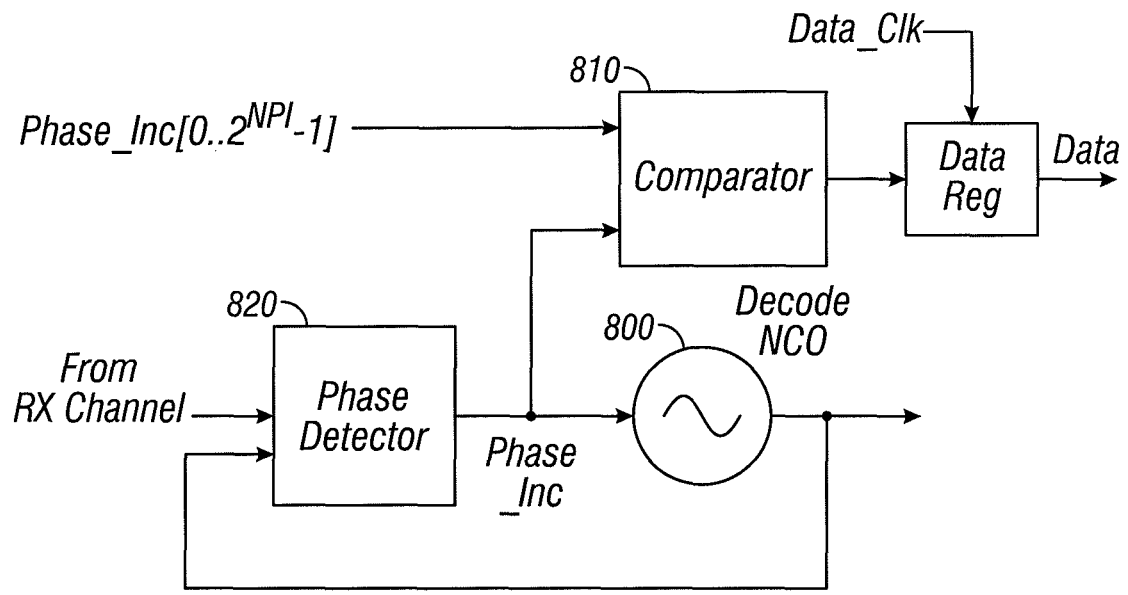
FIGS. 8a-8b show exemplary methods of decoding FSK/PSK modulated data, according to various embodiments.
Figure 8B:
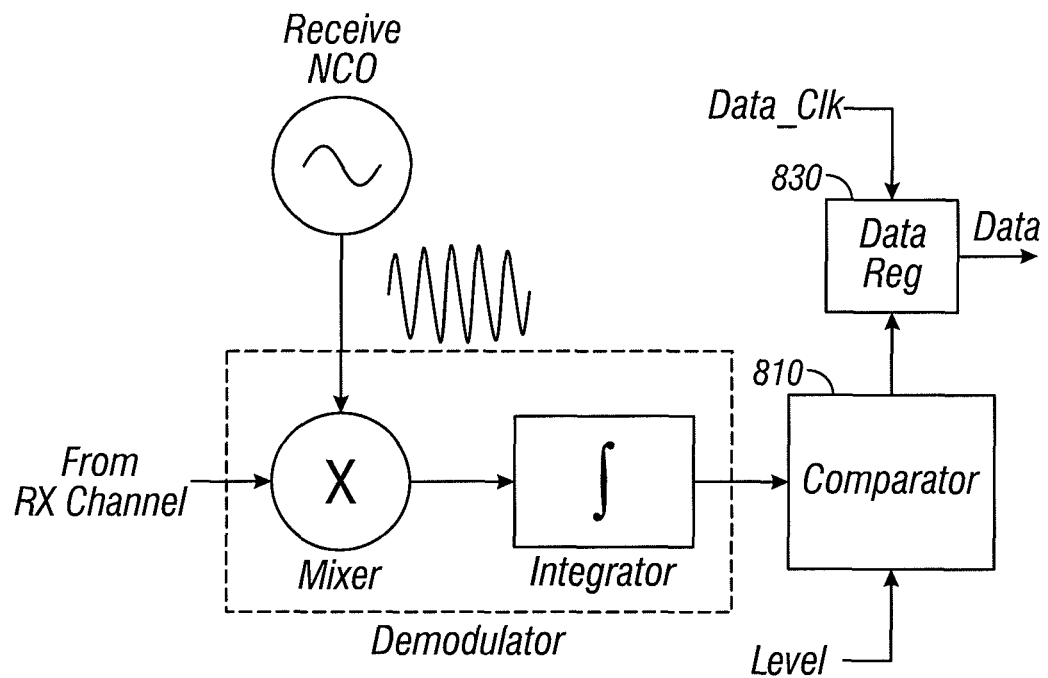

FIGS. 8A-8B show exemplary methods of decoding FSK/PSK modulated data. The simplified circuit shown in FIG. 8A can be used to decode FSK modulated data. A dedicated decode NCO 800 can be used, whose synthesized decode stimulus waveform can be compared to the digitized ADC waveform from the receive channel by a phase comparator 810. The phase comparator 810 can adjust the phase increment into the data decode NCO 800 until the two waveforms match in frequency and phase. The resultant phase increment can approximately match the phase increment of the transmitter device according to Equation 21. The matching is a function of the frequency mismatch between the reference clock of the transmitter and receiver devices. In order to recover the data, a comparator 810 can be used that compares the phase increment out of the phase detector 820 to predetermined levels of phase_increment. It can be better to select the halfway point between adjacent phase increments. For example, if the transmitter encodes phase_inc[0] as a binary zero and phase_inc[1] as a binary 1, then it can be practical to set the threshold level on the receiver device to (phase_inc[0]+phase_inc[1])/2. The data resolution can be a function of the number of phase_increment levels. A data resolution of NPI requires 2^NPI phase_increment levels.

FIG. 8B shows an exemplary method to decode FSK/PSK modulated data. For FSK modulated data the demodulator can behave as a discriminator that converts the FSK decoded signal into an AM modulated signal due to passband frequency response of the demodulator at different frequencies. The demodulated result can be represented with the following equation:

$$N_{RESULT}(\omega_{FSK}) = \quad (25)$$

$$N_{FSK} \cdot N_D \cdot \sum_{N=1}^{N_{INT}} W_D(N) \cdot \sin\left(N \cdot \frac{\omega_{STM}}{f_{ADC\_CLK}}\right) \cdot \sin\left(N \cdot \frac{\omega_{FSK}}{f_{ADC\_CLK}}\right)$$

Here $N_{RESULT}$ can be the result after an integration over $N_{INT}$ integration cycles; $N_{FSK}$ and $N_D$ can be amplitudes of the FSK modulated data and the demodulation waveform, respectively; $\omega_{FSK}$ and $\omega_{STM}$ can be the frequencies (in radians) of the FSK and stimulus signal, respectively; and $W_D$ can be the demodulation window. The circuit in FIG. 8B can also be used to demodulate PSK modulated data.

The demodulated result can be expressed as:

$$N_{RESULT}(\omega_{FSK}) = \quad (26)$$

$$N_{PSK} \cdot N_D \cdot \sum_{N=1}^{N_{INT}} W_D(N) \cdot \sin\left(N \cdot \frac{\omega_{PSK}}{f_{ADC\_CLK}} + \varphi\right) \cdot \sin\left(N \cdot \frac{\omega_{STM}}{f_{ADC\_CLK}}\right)$$

Here $N_{RESULT}$ can be the result after an integration over $N_{INT}$ integration cycles; $N_{PSK}$ and $N_D$ can be amplitudes of the PSK modulated data and the demodulation waveform, respectively; $\omega_{PSK}$ and $\omega_{STM}$ can be the frequencies (in radians) of the PSK and stimulus signal, respectively; $W_D$ can be the demodulation window; and $\varphi$ is the phase shift between the PSK modulated signal and the demodulation signal. Since $\omega_{PSK} = \omega_{FSK}$ $N_{RESULT}$ becomes a function of $\cos(\varphi)$ as shown in equation (14), and $\varphi$ is a function of the PSK modulated data from the transmitting device.

Decoded data can be captured in a data register 830 at a clock rate DATA_CLK which can be the decimated version of the stimulus frequency.

Figures 9A, 9B:
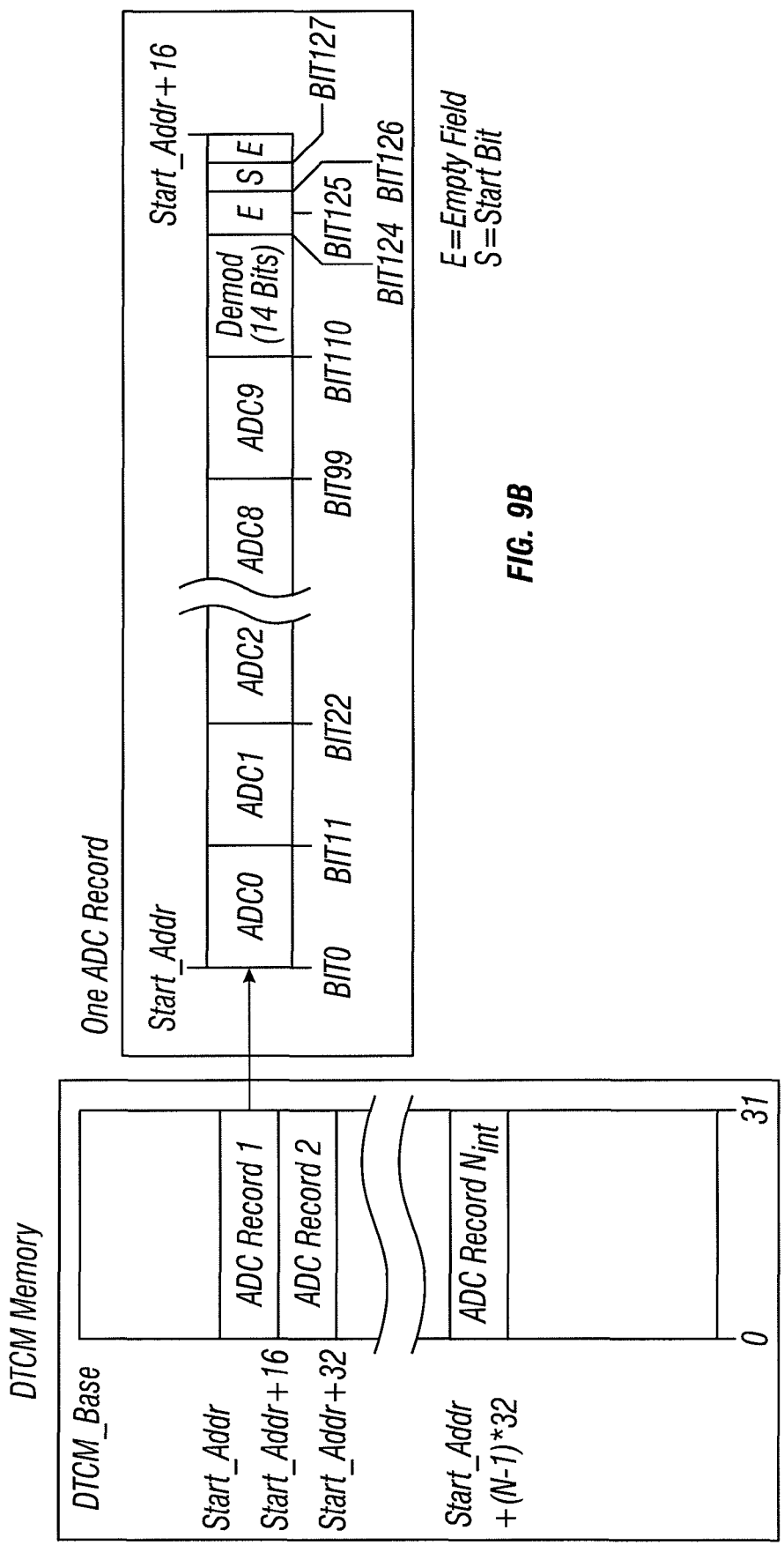
FIG. 9a illustrates an exemplary DTCM, according to various embodiments.
FIG. 9b illustrates an exemplary captured record in a DTCM, according to various embodiments.

FIG. 9a illustrates an exemplary DTCM 510, according to various embodiments. As shown in FIG. 9a, DTCM 510 can capture $N_{int}$ records, where $N_{int}$ can be a programmable number of records captured during one integration period, as described above.

Figure 10A:
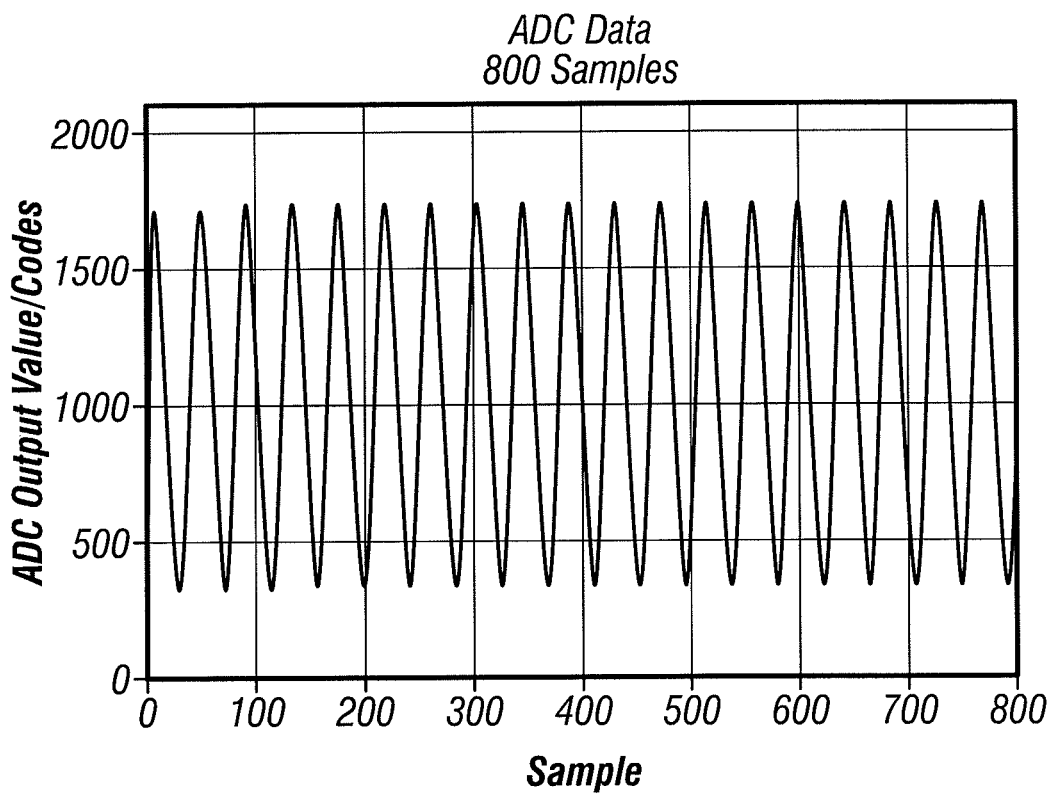
FIG. 10a shows an exemplary waveform captured by an analog to digital converter, according to various embodiments.
Figure 10B:
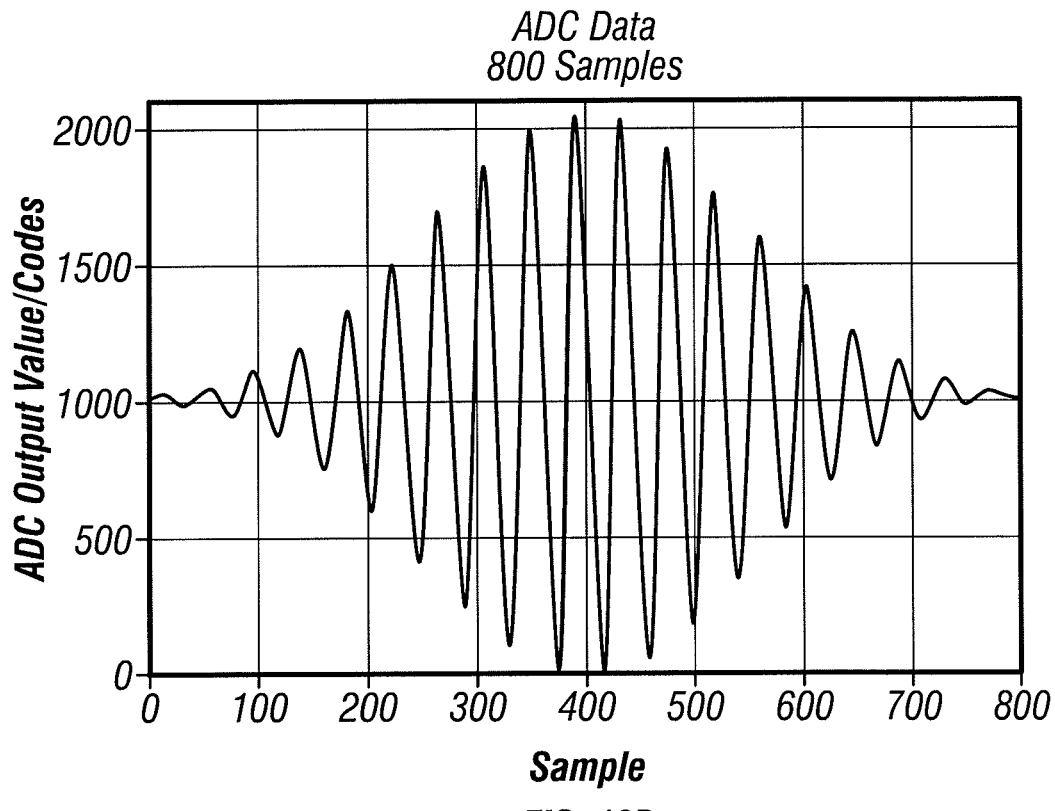
FIG. 10b shows an exemplary demodulation waveform, according to various embodiments.

FIG. 9b illustrates an exemplary captured record in a DTCM 510, according to various embodiments. As shown in the exemplary record, 10 ADC 405 outputs (ADC0 through ADC9) can be stored, along with a correlating demodulation waveform, for example, at a specified start address (START_ADDR) in DTCM 510. Any number of empty bits E can be included in a record, along with start bit S which, indicates the start of a scan sequence. FIG. 10A shows an exemplary waveform captured by the ADC across $N_{int}=800$ samples. One sample can represent the value of, for example, ADC0 in one record shown in FIG. 9B. FIG. 10B shows an exemplary demodulation waveform across $N_{int}=800$ samples.

Figure 11:
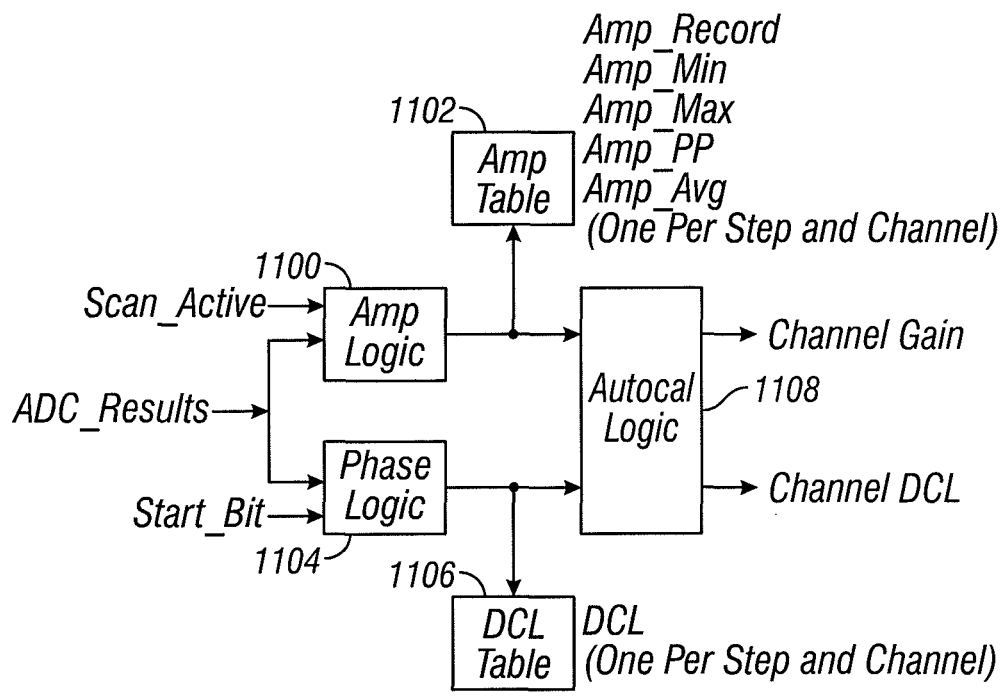
FIG. 11 illustrates an exemplary amplitude and phase capture and auto-calibration circuit, according to various embodiments.

FIG. 11 illustrates an exemplary amplitude and phase capture and auto-calibration circuit, according to various embodiments. As described above, the plurality of records captured in DTCM 510 can be used for auto-calibration of various parameters. For example, the phase of the sense channel outputs can be compared to the correlating demodulation waveform to determine a relative phase shift. Thereafter, a programmable delay can be employed to adjust the phase of the sense channel output. Also, the amplitude of the sense channel outputs can be used to determine the gain of the sense channel, which can be adjusted accordingly.

Referring to FIG. 11, sense channel outputs can be fed into amplitude logic 1100, which can include a min/max register (not shown), as well as phase logic 1104. A SCAN_ACTIVE bit and a START_BIT can be input to amplitude logic 1100 and phase logic 1104, respectively, to begin the auto-calibration(s). An amplitude record can be created in amplitude table 1102, which can store AMP_MIN (i.e., the most negative peak), AMP_MAX (i.e., the most positive peak), AMP_PP (i.e., the peak-to-peak=AMP_MAX-AMP_MIN), and/or AMP_AVG (i.e., the average amplitude). Autocal logic 1108 is configured to determine the gain of the sense channel using the amplitude data.

Figure 12:
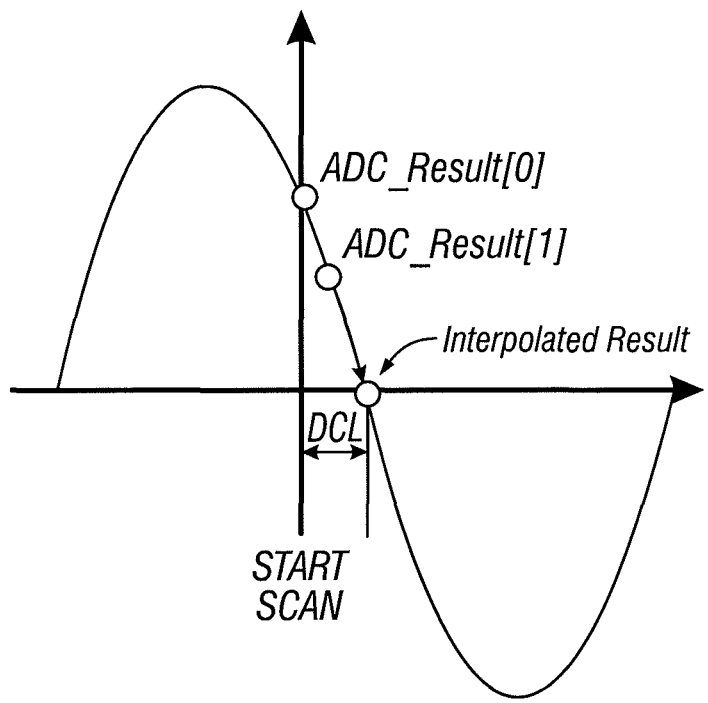
FIG. 12 illustrates an exemplary phase capture, according to various embodiments.

Similarly, DCL table 1106 can contain a phase record, using phase data captured using a waveform, as shown in FIG. 12. Two consecutive ADC 405 output results (ADC_RESULT[0] and ADC_RESULT[1]) may be captured. Using a linear interpolation, for example, the DCL can be derived from the ADC results, and then stored in DCL table 1106. Autocal logic 1108 (communicatively coupled to processor 520, for example) can use the DCL stored in DCL table 1106 to determine a delay that can be dynamically applied to the sense channel, depending on a desired phase shift with respect to the demodulation waveform.

Figure 13:
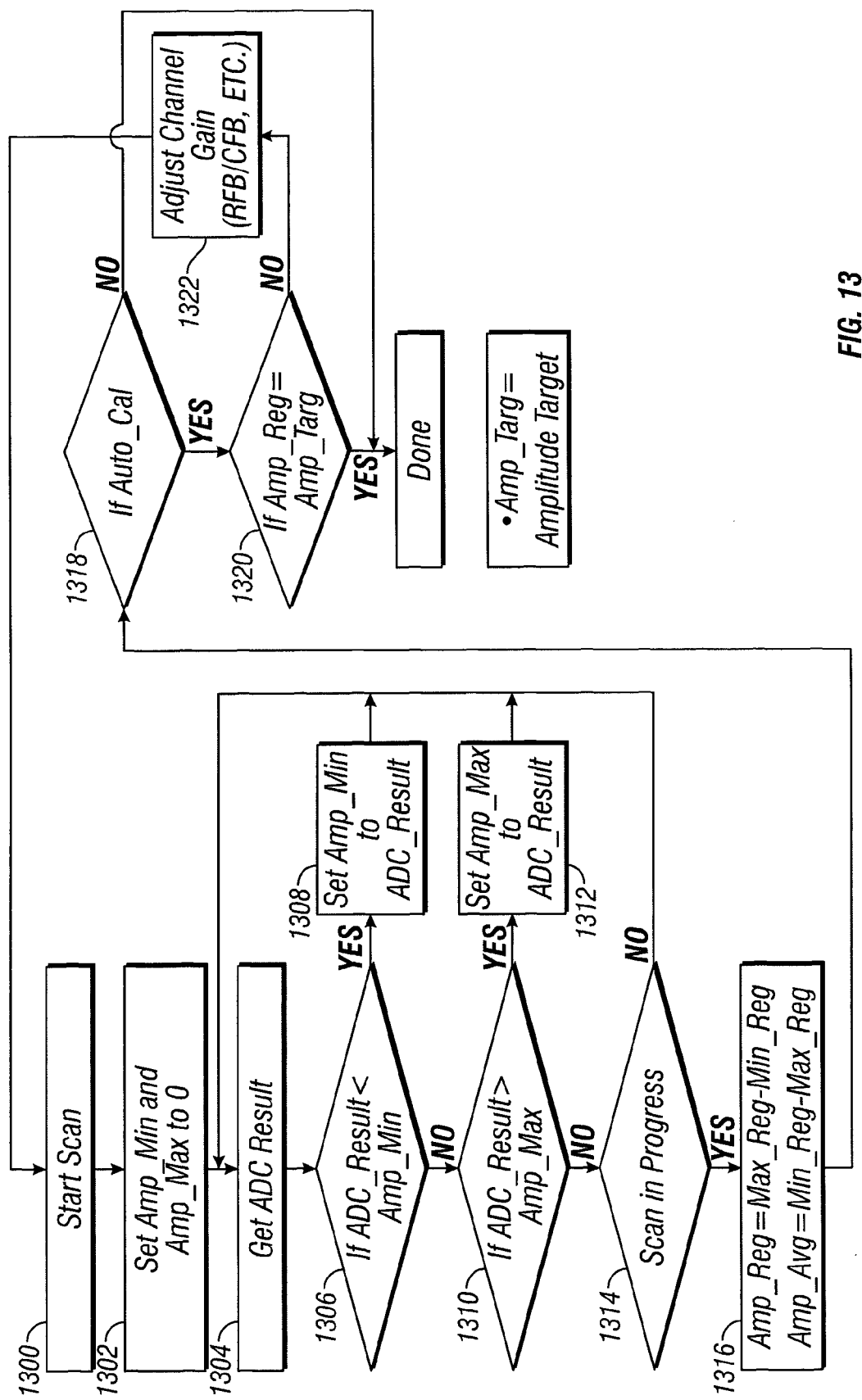
FIG. 13 illustrates an exemplary algorithm for auto-calibration of gain of a sense channel, according to various embodiments.

FIG. 13 illustrates an exemplary algorithm for auto-calibration of gain of a sense channel, according to various embodiments. Referring to FIG. 13, at operation 1300, the SCAN_ACTIVE bit can be fed into amplitude logic 1100, along with ADC_RESULTS (see FIG. 11). Initially, the minimum and maximum amplitudes can be set to zero in amplitude table 1102, at operation 1302.

From operation 1302, the process can continue to operation 1304 where an ADC 405 output is obtained, and is compared to AMP_MIN at operation 1306. If ADC_RESULT is less than AMP_MIN (initially zero), then AMP_MIN can be set to ADC_RESULT at operation 1308, and another ADC_RESULT can be obtained. If ADC_RESULT is not less than AMP_MIN, then it can be determined if ADC_RESULT is greater than AMP_MAX (initially zero), at operation 1310. If ADC_RESULT is greater than AMP_MAX, the AMP_MAX can be set to AMP_RESULT at operation 1312, and another ADC_RESULT can be obtained at operation 1304. The above process can be repeated until the scan is complete.

If the scan is complete in step 1314, then AMP_REG can be set to MAX_REG−MIN_REG, and AMP_AVG can be set to MIN_REG+MAX_REG, at operation 1316. AMP_REG can contain the peak-to-peak amplitude AMP_PP of the captured waveform across the scan duration.

At operation 1318, it can be determined whether the auto-calibration function is being implemented. If not, then the process can end. If auto-calibration is desired, then AMP_REG can be compared to target amplitude AMP_TARG, at operation 1320. If the two are unequal, then the gain of the sense channel 307 (e.g., the gain of pre-amplifier 401) can be adjusted, using processor 520, for example, at operation 1322. If it is determined that AMP_REG=AMP_TARG, then the process can end.

Figure 14:
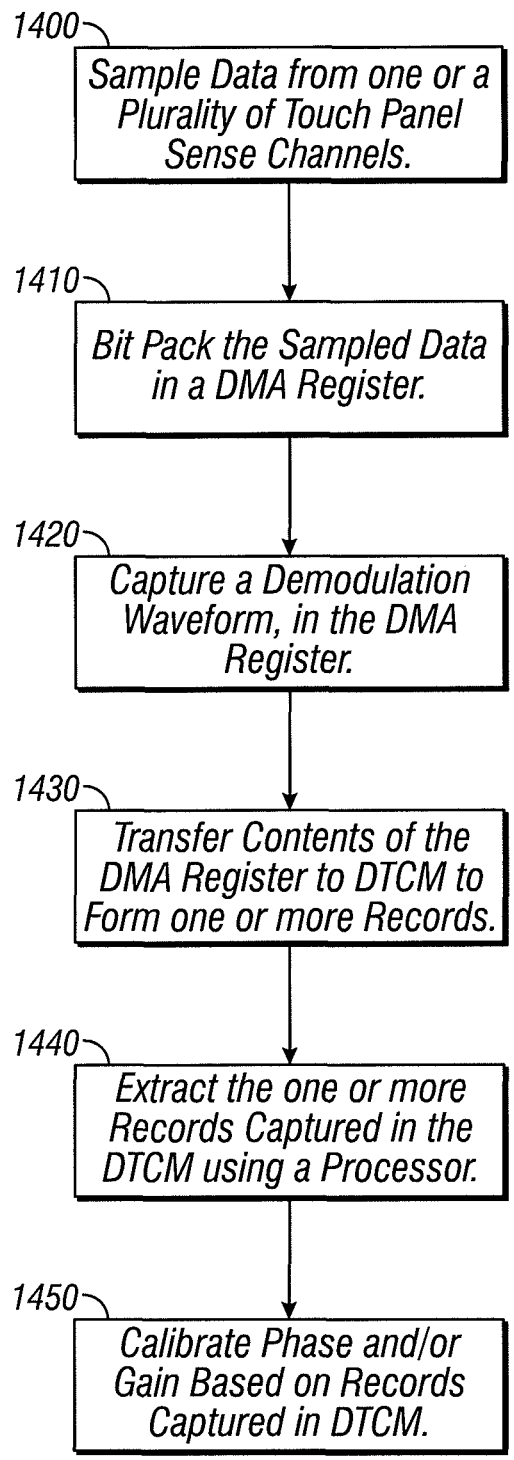
FIG. 14 illustrates a method of sampling data for diagnostics and calibration support, according to various embodiments.

FIG. 14 illustrates a method of sampling data for diagnostics and calibration support, according to various embodiments. Referring to FIG. 14, at operation 1400, one or a plurality of outputs (waveform data) of A/D converter 405 of sense channel 307 can be sampled at DMA 500, for example. As note above, various types of storage mechanisms can be employed; however, DMA 500 is described herein for exemplary purposes. Moreover, any number of sense channel outputs can be sampled.

From operation 1400, the process can continue to operation 1410, where the sampled data can be bit packed in DMA 500. According to an example described herein, each sense channel output is 10 bits. Therefore, if 10 sense channel outputs are sampled, four 32 bit registers can be required in DMA 500. However, various combinations of sense channel output sizes and numbers of sense channel outputs can be utilized.

The demodulated waveform from mixer 409 can also be input to DMA 500, at operation 1420. The demodulated waveform can be correlated with the sampled sense channel outputs that are stored in DMA 500 as well. Of course, a start bit can be stored in DMA 500, which can indicated the beginning of a scan sequence.

At operation 1430, the contents of DMA 500, including the sampled waveform data and the demodulation waveform, can be transferred to DTCM 510, to form one or more records. The transfer can be implemented using a local bus 349, for example. As described above, DTCM 510 can include a start register such that when the start bit stored in DMA 500 appears in the start register, DTCM 510 begins storing records. $N_{int}$ records can be collected, where $N_{int}$ is a programmable number (e.g., any integer from 0 to 2047) of records captured during one integration period.

At operation 1440, processor 520 can extract the one or more records from DTCM 510, the information in which can be used to diagnose performance issues (e.g., phase delays and/or noise) at sense channel 307. Using HTTP protocol, for example, a user can display the records on any remote workstation, using host processor 520. The one or more records can be stored in memory 530 to create historical performance data of sense channel 307, for example. In addition, the demodulation result register (see 315 in FIG. 3) can be re-created for ultimate flexibility in performing diagnostics operations.

In addition, processor 520 can perform auto-calibration for various parameters affecting sense channel 307, such as phase shifting and noise filtering. For example, by comparing the waveform data of the sense channel outputs with the demodulation waveform from mixer 409, host processor 520 can determine the relevant phase shift, which can be automatically calibrated using programmable delays. Also, a min/max register can be employed to determine a maximum amplitude, in order to determine a gain of sense channel 307, which can be automatically calibrated at pre-amplifier 401, by host processor 520.

Figure 15A:
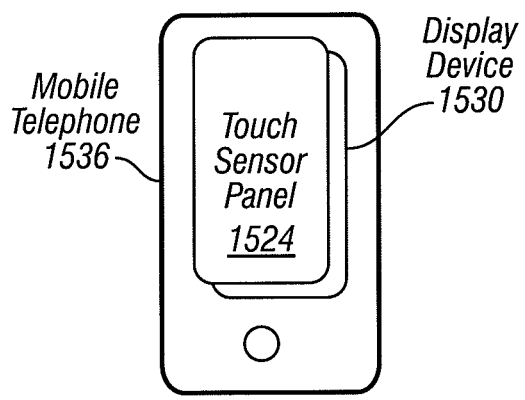
FIG. 15a illustrates an exemplary mobile telephone that can include a touch sensor panel according to the various embodiments described herein.

FIG. 15a illustrates an example mobile telephone 1536 that can include touch sensor panel 1524 and display device 1530, the touch sensor panel including improved diagnostics and calibration support according to one of the various embodiments described herein.

Figure 15B:
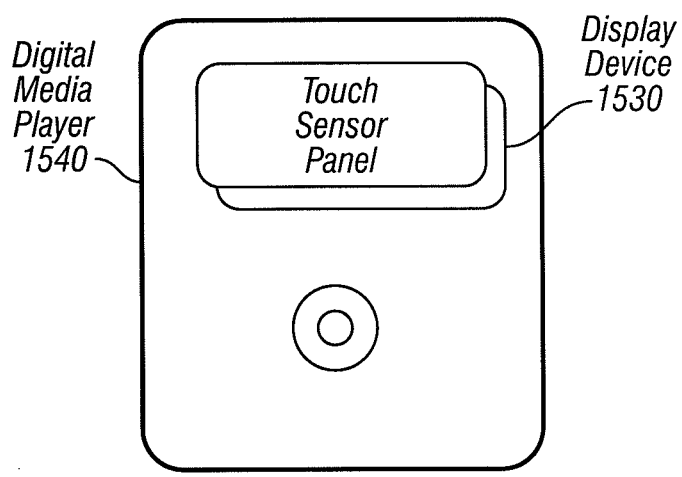
FIG. 15b illustrates an exemplary digital media player that can include a touch sensor panel according to the various embodiments described herein.

FIG. 15b illustrates an example digital media player 1540 that can include touch sensor panel 1524 and display device 1530, the touch sensor panel including improved diagnostics and calibration support according to one of the various embodiments described herein.

Figure 15C:
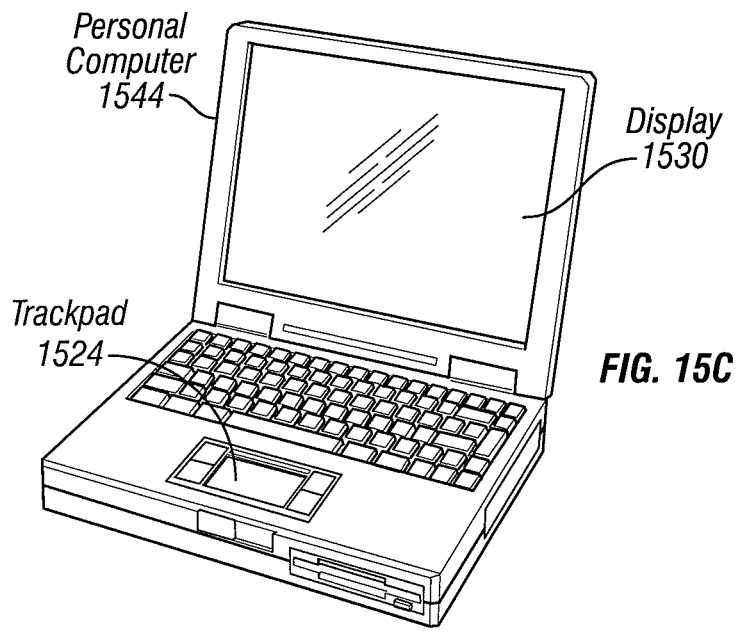
FIG. 15c illustrates exemplary personal computer that can include a touch sensor panel according to the various embodiments described herein.

FIG. 15c illustrates an example personal computer 1544 that can include touch sensor panel (trackpad) 1524 and display 1530, the touch sensor panel and/or display of the personal computer (in embodiments where the display is part of a touch screen) including improved diagnostics and calibration support according to the various embodiments described herein.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A method, comprising;
    sampling data from one or a plurality of touch panel sense channels prior to demodulation;
    capturing a demodulation waveform, correlated with the sampled data, to form a record;
    storing one or a plurality of records; and
    accessing the one or a plurality of records to extract diagnostics information.

2. The method of claim 1, further comprising:
    displaying at least part of the one or a plurality of records.

3. The method of claim 1, further comprising:
    automatically calibrating a gain of the one or a plurality of sense channels based at least in part on one or more captured records.

4. The method of claim 3, further comprising capturing minimum and maximum amplitude data to compute the gain of the one or a plurality of sense channels.

5. The method of claim 1, further comprising:
determining a relative phase shift between the sampled data and the demodulation waveform.

6. The method of claim 5, further comprising:
automatically calibrating a phase of the one or a plurality of sense channels, based at least in part on one or more captured records.

7. The method of claim 1, wherein the one or a plurality of records are captured when a start bit is stored in a start register.

8. The method of claim 1, wherein N records are captured, wherein N is an integer greater than or equal to 1, and depends on a programmable integration period.

9. The method of claim 8, wherein each record includes a predetermined number of sense channel outputs and a correlating demodulation waveform.

10. The method of claim 1, wherein the sampled data is composite touch data.

11. The method of claim 1, wherein the touch panel sense channel is incorporated within a computing system.

12. A touch controller, comprising;
a data capture register configured to sample data from one or a plurality of touch panel sense channels prior to demodulation, and to capture a demodulation waveform correlated with the sampled data;
a memory configured to form a record, including the sampled data and the demodulation waveform, and to store one or a plurality of records; and
a processor configured to access the one or a plurality records to extract diagnostics information.

13. The touch controller of claim 12, wherein the processor is further configured to automatically calibrate a gain of the one or a plurality of sense channels, based on at least part of the one or more records captured in the memory.

14. The touch controller of claim 13, further comprising a min/max register configured to capture minimum and maximum amplitude data to compute the gain of the one or a plurality of sense channels.

15. The touch controller of claim 12, wherein the processor is further configured to determine a relative phase shift between the sampled data and the demodulation waveform.

16. The touch controller of claim 15, wherein the processor is further configured to automatically calibrate a phase of the one or a plurality of sense channels, based on at least part of the one or more records captured in the memory.

17. The touch controller of claim 12, wherein the memory is coupled to a start register, and the memory is configured to capture the one or a plurality of records when a start bit is stored in the start register.

18. The touch controller of claim 12, wherein the memory is configured to capture N records, wherein N is an integer greater than or equal to 1, and depends on a programmable integration period.

19. The touch controller of claim 18, wherein each record includes a predetermined number of sense channel outputs and a correlating demodulation waveform.

20. The touch controller of claim 12, wherein the sampled data is composite touch data.

21. The touch controller of claim 12, wherein the plurality of touch panel sense channels are within a touch sensor panel.

22. The touch controller of claim 21, wherein the touch sensor panel is incorporated within a computing system.

23. A system, comprising:
means for sampling data from one or a plurality of touch panel sense channels prior to demodulation;
means for capturing a demodulation waveform, correlated with the sampled data, to form a record;
means for storing one or a plurality of records; and
means for accessing the one or a plurality of records to extract diagnostics information.

* * * * *